United States Patent
Conway et al.

(10) Patent No.: US 9,942,400 B2
(45) Date of Patent: *Apr. 10, 2018

(54) SYSTEM AND METHODS FOR ANALYZING MULTICHANNEL COMMUNICATIONS INCLUDING VOICE DATA

(71) Applicant: Mattersight Corporation, Chicago, IL (US)

(72) Inventors: Kelly Conway, Lake Bluff, IL (US);
Christopher Danson, Austin, TX (US);
Douglas Brown, Austin, TX (US);
David Gustafson, Lake Bluff, IL (US);
Roger Warford, Hoschton, GA (US);
Melissa Moore, Chicago, IL (US);
Keene Hedges Capers, La Jolla, CA (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,333

(22) Filed: May 25, 2017

(65) Prior Publication Data

US 2017/0264744 A1    Sep. 14, 2017

Related U.S. Application Data

(63) Continuation of application No. 15/224,002, filed on Jul. 29, 2016, now Pat. No. 9,667,788, which is a
(Continued)

(51) Int. Cl.
*H04M 3/51* (2006.01)
*H04M 3/523* (2006.01)
(Continued)

(52) U.S. Cl.
CPC ........ *H04M 3/5175* (2013.01); *G06Q 30/016* (2013.01); *G10L 25/63* (2013.01);
(Continued)

(58) Field of Classification Search
CPC ............. H04M 3/5175; H04M 3/5141; H04M 7/0012; H04M 3/42161; H04M 3/5191;
(Continued)

(56) References Cited

U.S. PATENT DOCUMENTS 3,851,121 A    11/1974   Marvin
3,855,418 A    12/1974   Fuller
(Continued)

FOREIGN PATENT DOCUMENTS

EP    0862304 A2    9/1998
EP    0863678 A2    9/1998
(Continued)

OTHER PUBLICATIONS

Abstract: Killerbrew, Wayne et al, "Playing by the rules," Telephony, vol. 235, No. 25, Dec. 21, 1981, 1 page.
(Continued)

*Primary Examiner* — Harry S Hong
(74) *Attorney, Agent, or Firm* — Haynes and Boone, LLP

(57) ABSTRACT

Methods, behavioral assessment computer program products, and systems for analyzing electronic customer communication data, generating behavioral assessment data and displaying instructions to a user that include receiving a plurality of types of electronic customer communication data by one or more servers configured to provide a user interface including a web site, web portal, or virtual portal or application, wherein at least one of the types of electronic communication data includes voice data, generating a text file from the voice data, identifying a customer associated with the electronic communication data received by the one
(Continued)

or more servers, generating behavioral assessment data for the electronic communication data for that identified customer by analyzing the customer's electronic communication data, and displaying instructions to a user via a reporting engine, wherein the instructions are based on the generated behavioral assessment data, and wherein the user includes the identified customer or a customer service agent.

23 Claims, 13 Drawing Sheets

Related U.S. Application Data continuation of application No. 14/808,092, filed on Jul. 24, 2015, now Pat. No. 9,407,768, which is a continuation of application No. 13/828,864, filed on Mar. 14, 2013, now Pat. No. 9,191,510.

(51) Int. Cl.
| | |
|---|---|
| H04M 3/42 | (2006.01) |
| G06Q 30/00 | (2012.01) |
| H04L 29/12 | (2006.01) |
| H04L 29/08 | (2006.01) |
| H04M 7/00 | (2006.01) |
| G10L 25/63 | (2013.01) |

(52) U.S. Cl.
CPC .......... *H04L 61/1582* (2013.01); *H04L 67/02* (2013.01); *H04L 67/10* (2013.01); *H04L 67/20* (2013.01); *H04M 3/42161* (2013.01); *H04M 3/5191* (2013.01); *H04M 7/0012* (2013.01); *H04M 3/5141* (2013.01); *H04M 2203/555* (2013.01); *H04M 2203/556* (2013.01)

(58) Field of Classification Search
CPC ...... H04M 2203/556; H04M 2203/555; G10L 25/63; H04L 61/1582; H04L 67/02; H04L 67/10; H04L 67/20; G06Q 30/016
See application file for complete search history.

(56) References Cited

U.S. PATENT DOCUMENTS

| | | |
|---|---|---|
| 3,971,034 A | 7/1976 | Bell, Jr. et al. |
| 4,093,821 A | 6/1978 | Williamson |
| 4,142,067 A | 2/1979 | Williamson |
| 4,377,158 A | 3/1983 | Friedman et al. |
| 4,490,840 A | 12/1984 | Jones |
| 4,694,483 A | 9/1987 | Cheung |
| 5,148,483 A | 9/1992 | Silverman |
| 5,148,493 A | 9/1992 | Bruney |
| 5,206,903 A | 4/1993 | Kohler et al. |
| 5,239,460 A | 8/1993 | LaRoche |
| 5,299,260 A | 3/1994 | Shaio |
| 5,467,391 A | 11/1995 | Donaghue, Jr. et al. |
| 5,500,795 A | 3/1996 | Powers et al. |
| 5,535,256 A | 7/1996 | Maloney et al. |
| 5,559,875 A | 9/1996 | Bieselin et al. |
| 5,561,707 A | 10/1996 | Katz |
| 5,577,254 A | 11/1996 | Gilbert |
| 5,590,171 A | 12/1996 | Howe et al. |
| 5,590,188 A | 12/1996 | Crockett |
| 5,594,790 A | 1/1997 | Curreri et al. |
| 5,594,791 A | 1/1997 | Szlam et al. |
| 5,621,789 A | 4/1997 | McCalmont et al. |
| 5,633,916 A | 5/1997 | Goldhagen et al. |
| 5,646,981 A | 7/1997 | Klein |
| 5,696,811 A | 12/1997 | Maloney et al. |
| 5,710,884 A | 1/1998 | Dedrick |
| 5,712,954 A | 1/1998 | Dezonno |
| 5,717,742 A | 2/1998 | Hyde-Thomson |
| 5,721,827 A | 2/1998 | Logan et al. |
| 5,724,420 A | 3/1998 | Torgrim |
| 5,732,216 A | 3/1998 | Logan et al. |
| 5,734,890 A | 3/1998 | Case et al. |
| 5,737,405 A | 4/1998 | Dezonno |
| 5,757,904 A | 5/1998 | Anderson |
| 5,764,728 A | 6/1998 | Ala et al. |
| 5,765,513 A | 6/1998 | Diehl et al. |
| 5,784,452 A | 7/1998 | Carney |
| 5,790,798 A | 8/1998 | Beckett, II et al. |
| 5,799,063 A | 8/1998 | Krane |
| 5,809,250 A | 9/1998 | Kisor |
| 5,815,551 A | 9/1998 | Katz |
| 5,818,907 A | 10/1998 | Maloney et al. |
| 5,818,909 A | 10/1998 | Van Berkum et al. |
| 5,822,306 A | 10/1998 | Catchpole |
| 5,822,400 A | 10/1998 | Smith |
| 5,822,410 A | 10/1998 | McCausland et al. |
| 5,822,744 A | 10/1998 | Kesel |
| 5,825,869 A | 10/1998 | Brooks et al. |
| 5,828,730 A | 10/1998 | Zebryk et al. |
| 5,841,966 A | 11/1998 | Irribarren |
| 5,845,290 A | 12/1998 | Yoshii |
| 5,848,396 A | 12/1998 | Gerace |
| 5,854,832 A | 12/1998 | Dezonno |
| 5,857,175 A | 1/1999 | Day et al. |
| 5,859,898 A | 1/1999 | Checco |
| 5,864,616 A | 1/1999 | Hartmeier |
| 5,870,549 A | 2/1999 | Bobo, II |
| 5,875,436 A | 2/1999 | Kikinis |
| 5,878,384 A | 3/1999 | Johnson et al. |
| 5,884,032 A | 3/1999 | Bateman et al. |
| 5,884,262 A | 3/1999 | Wise et al. |
| 5,894,512 A | 4/1999 | Zenner |
| 5,897,616 A | 4/1999 | Kanevsky et al. |
| 5,903,641 A | 5/1999 | Tonisson |
| 5,910,107 A | 6/1999 | Iliff |
| 5,911,776 A | 6/1999 | Guck |
| 5,914,951 A | 6/1999 | Bentley et al. |
| 5,915,001 A | 6/1999 | Uppaluru |
| 5,915,011 A | 6/1999 | Miloslaysky |
| 5,923,746 A | 7/1999 | Baker et al. |
| 5,926,538 A | 7/1999 | Deryugin et al. |
| 5,930,764 A | 7/1999 | Melchione et al. |
| 5,940,476 A | 8/1999 | Morganstein et al. |
| 5,940,494 A | 8/1999 | Rafacz et al. |
| 5,940,792 A | 8/1999 | Hollier |
| 5,943,416 A | 8/1999 | Gisby |
| 5,945,989 A | 8/1999 | Freishtat et al. |
| 5,946,375 A | 8/1999 | Pattison et al. |
| 5,946,388 A | 8/1999 | Walker et al. |
| 5,951,643 A | 9/1999 | Shelton et al. |
| 5,953,389 A | 9/1999 | Pruett et al. |
| 5,953,406 A | 9/1999 | LaRue et al. |
| 5,964,839 A | 10/1999 | Johnson et al. |
| 5,978,465 A | 11/1999 | Corduroy et al. |
| 5,987,415 A | 11/1999 | Breese et al. |
| 5,991,735 A | 11/1999 | Gerace |
| 6,003,013 A | 12/1999 | Boushy et al. |
| 6,006,188 A | 12/1999 | Bogdashevsky et al. |
| 6,009,163 A | 12/1999 | Nabkel et al. |
| 6,014,647 A | 1/2000 | Nizzari et al. |
| 6,021,428 A | 2/2000 | Miloslaysky |
| 6,026,397 A | 2/2000 | Sheppard |
| 6,029,153 A | 2/2000 | Bauchner et al. |
| 6,058,163 A | 5/2000 | Pattison et al. |
| 6,064,731 A | 5/2000 | Flockhart et al. |
| 6,078,891 A | 6/2000 | Riordan et al. |
| 6,108,711 A | 8/2000 | Beck et al. |
| 6,128,380 A | 10/2000 | Shaffer et al. |
| 6,151,571 A | 11/2000 | Pertnishin |
| 6,173,053 B1 | 1/2001 | Bogart et al. |
| 6,185,534 B1 | 2/2001 | Breese et al. |
| 6,205,215 B1 | 3/2001 | Dombakly |
| 6,212,502 B1 | 4/2001 | Ball et al. |
| 6,243,684 B1 | 6/2001 | Stuart et al. |
| 6,275,806 B1 | 8/2001 | Pertnishin |
| 6,286,030 B1 | 9/2001 | Wenig et al. |
| 6,289,094 B1 | 9/2001 | Miloslaysky |

(56) References Cited

U.S. PATENT DOCUMENTS

| | | |
|---|---|---|
| 6,295,353 B1 | 9/2001 | Flockhart et al. |
| 6,334,110 B1 | 12/2001 | Walter et al. |
| 6,345,094 B1 | 2/2002 | Khan et al. |
| 6,353,810 B1 | 3/2002 | Petrushin |
| 6,363,145 B1 | 3/2002 | Shaffer et al. |
| 6,363,346 B1 | 3/2002 | Walters |
| 6,366,658 B1 | 4/2002 | Bjornberg et al. |
| 6,366,666 B2 | 4/2002 | Bengtson et al. |
| 6,370,574 B1 | 4/2002 | House et al. |
| 6,389,132 B1 | 5/2002 | Price |
| 6,392,666 B1 | 5/2002 | Hong et al. |
| 6,404,883 B1 | 6/2002 | Hartmeier |
| 6,411,687 B1 | 6/2002 | Bohacek et al. |
| 6,411,708 B1 | 6/2002 | Khan |
| 6,424,709 B1 | 7/2002 | Doyle et al. |
| 6,427,137 B2 | 7/2002 | Pertrushin |
| 6,434,230 B1 | 8/2002 | Gabriel |
| 6,434,231 B2 | 8/2002 | Neyman et al. |
| 6,446,119 B1 | 9/2002 | Olah et al. |
| 6,466,663 B1 | 10/2002 | Ravenscroft et al. |
| 6,480,601 B1 | 11/2002 | McLaughlin |
| 6,480,826 B2 | 11/2002 | Pertrushin |
| 6,490,560 B1 | 12/2002 | Ramaswamy et al. |
| 6,510,220 B1 | 1/2003 | Beckett, II et al. |
| 6,535,601 B1 | 3/2003 | Flockhart et al. |
| 6,542,156 B1 | 4/2003 | Hong et al. |
| 6,542,602 B1 | 4/2003 | Elazar |
| 6,553,112 B2 | 4/2003 | Ishikawa |
| 6,556,976 B1 | 4/2003 | Callen |
| 6,567,504 B1 | 5/2003 | Kercheval et al. |
| 6,567,787 B1 | 5/2003 | Walker et al. |
| 6,574,605 B1 | 6/2003 | Sanders et al. |
| 6,598,020 B1 | 7/2003 | Kleindienst et al. |
| 6,600,821 B1 | 7/2003 | Chan et al. |
| 6,601,031 B1 | 7/2003 | O'Brien |
| 6,611,498 B1 | 8/2003 | Baker et al. |
| 6,628,777 B1 | 9/2003 | McIllwaine et al. |
| 6,643,622 B2 | 11/2003 | Stuart et al. |
| 6,647,372 B1 | 11/2003 | Brady et al. |
| 6,658,388 B1 | 12/2003 | Kleindienst et al. |
| 6,658,391 B1 | 12/2003 | Williams et al. |
| 6,662,156 B2 | 12/2003 | Bartosik |
| 6,665,644 B1 | 12/2003 | Kanevsky et al. |
| 6,674,447 B1 | 1/2004 | Chiang et al. |
| 6,691,073 B1 | 2/2004 | Erten et al. |
| 6,697,457 B2 | 2/2004 | Pertrushin |
| 6,700,972 B1 | 3/2004 | McHugh et al. |
| 6,711,543 B2 | 3/2004 | Cameron |
| 6,721,417 B2 | 4/2004 | Saito et al. |
| 6,721,704 B1 | 4/2004 | Strubbe et al. |
| 6,724,887 B1 | 4/2004 | Eilbacher et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,760,414 B1 | 7/2004 | Schurko et al. |
| 6,760,727 B1 | 7/2004 | Schroeder et al. |
| 6,766,012 B1 | 7/2004 | Crossley |
| 6,788,768 B1 | 9/2004 | Saylor et al. |
| 6,798,876 B1 | 9/2004 | Bala |
| 6,839,671 B2 | 1/2005 | Attwater et al. |
| 6,853,966 B2 | 2/2005 | Bushey et al. |
| 6,864,901 B2 | 3/2005 | Chang et al. |
| 6,868,154 B1 | 3/2005 | Stuart et al. |
| 6,868,392 B1 | 3/2005 | Ogasawara |
| 6,937,706 B2 | 8/2005 | Bscheider et al. |
| 6,959,079 B2 | 10/2005 | Elazar |
| 7,010,106 B2 | 3/2006 | Gritzer et al. |
| 7,010,109 B2 | 3/2006 | Gritzer et al. |
| 7,027,708 B2 | 4/2006 | Nygren et al. |
| 7,043,745 B2 | 5/2006 | Nygren et al. |
| 7,076,427 B2 | 7/2006 | Scarano et al. |
| 7,103,553 B2 | 9/2006 | Applebaum et al. |
| 7,127,058 B2 | 10/2006 | O'Connor et al. |
| 7,184,540 B2 | 2/2007 | Dezonno et al. |
| 7,219,138 B2 | 5/2007 | Straut et al. |
| 7,222,075 B2 | 5/2007 | Petrushin |
| 7,224,788 B1 | 5/2007 | Rhee et al. |
| 7,263,474 B2 | 8/2007 | Fables et al. |
| 7,305,345 B2 | 12/2007 | Bares et al. |
| 7,346,151 B2 | 3/2008 | Erhart et al. |
| 7,349,944 B2 | 3/2008 | Vernon et al. |
| 7,406,413 B2 | 7/2008 | Geppert et al. |
| 7,474,633 B2 | 1/2009 | Halbraich et al. |
| 7,613,635 B2 | 11/2009 | Blumenau |
| 7,940,914 B2 | 5/2011 | Petrushin |
| 7,953,219 B2 | 5/2011 | Freedman et al. |
| 7,995,717 B2 | 8/2011 | Conway et al. |
| 8,060,364 B2 | 11/2011 | Bachar et al. |
| 8,170,195 B2 | 5/2012 | Conway et al. |
| 8,255,514 B2 | 8/2012 | DeHaas et al. |
| 8,594,285 B2 | 11/2013 | Conway et al. |
| 9,083,801 B2 | 7/2015 | Conway et al. |
| 9,191,510 B2 | 11/2015 | Conway et al. |
| 9,407,768 B2 | 8/2016 | Conway et al. |
| 9,667,788 B2 * | 5/2017 | Conway ............... H04M 3/5175 |
| 2001/0033644 A1 | 10/2001 | Offer |
| 2003/0069780 A1 | 4/2003 | Hailwood et al. |
| 2003/0072463 A1 | 4/2003 | Chen |
| 2003/0154092 A1 | 8/2003 | Bouron et al. |
| 2003/0185379 A1 * | 10/2003 | O'Connor ............... H04L 51/14 |
| | | 379/265.02 |
| 2003/0193504 A1 | 10/2003 | Cook et al. |
| 2004/0054715 A1 | 3/2004 | Cesario |
| 2004/0073569 A1 | 4/2004 | Knott et al. |
| 2004/0100507 A1 | 5/2004 | Hayner et al. |
| 2004/0162724 A1 | 8/2004 | Hill et al. |
| 2004/0190687 A1 | 9/2004 | Baker |
| 2005/0010411 A1 | 1/2005 | Rigazion et al. |
| 2005/0010415 A1 | 1/2005 | Hagen et al. |
| 2006/0262920 A1 * | 11/2006 | Conway ............... G10L 15/1822 |
| | | 379/265.02 |
| 2006/0265089 A1 | 11/2006 | Conway et al. |
| 2008/0015865 A1 | 1/2008 | Chiu |
| 2012/0284080 A1 | 11/2012 | De Oliveira et al. |
| 2013/0051545 A1 | 2/2013 | Ross et al. |
| 2016/0337519 A1 | 11/2016 | Conway et al. |

FOREIGN PATENT DOCUMENTS

| | | |
|---|---|---|
| EP | 0998108 A1 | 5/2000 |
| EP | 1361739 A1 | 11/2003 |
| EP | 1635534 A2 | 3/2006 |
| GB | 2331201 | 5/1999 |
| GB | 2389736 | 12/2003 |
| WO | WO 01/74042 A2 | 10/2001 |
| WO | WO 02/17165 A2 | 2/2002 |
| WO | WO 02/073413 A2 | 9/2002 |
| WO | WO 03/009175 A1 | 1/2003 |
| WO | WO 03/0018909 A1 | 1/2003 |

OTHER PUBLICATIONS

Abstract: Garrison, P., "An Electronic Sales Call File," Computing for Business, vol. 9, No. 4, Apr. 1984, 1 page.

Abstract: Sullivan, Kristina B., Software helps salespeople generate new leads. (product announcement), PC Week, vol. 3, No. 38, Sep. 9, 1986, 2 pages.

Abstract: Kohli, Rajiv et al., Strategic application of organizational data through customer relational databases, Journal of Systems Management, vol. 44, No. 10, Oct. 1993, 2 pages.

"Efficiency ratio (ER) is increasingly era of permanent downsizing being looked to by bankers, analysts as a yardstick of operating success, in and cost reduction," Retail Banker International, No. 341 (Published in Ireland), Jan. 19, 1996, 3 pages.

Couretas, John, "Car dealer management software systems are being re-engineered with web technology to allow greater communications with customers," Automotive News, (Published in the United States), No. 5847, Nov. 8, 1999, 4 pages.

Abstract: "The Most Innovative Call Center Products We Saw in 1999," Call Center Magazine, vol. 13, No. 2, Feb. 1, 2000, 2 pages.

(56) References Cited

OTHER PUBLICATIONS

Abstract: "etalk and Utopy to Provide Enhanced Quality Monitoring and Speech Analytics Solutions to Contact Centers," Newswire, Apr. 7, 2003, 2 pages.
Abstract: Tan, Run-hua et al., "Innovation Design of product based on TRIZ," Journal of Hebei University of Technology, vol. 33, No. 2, 2004, 2 pages.
Abstract: Testa, Bridget Mintz, "Call Monitoring Gets Emotional," Telecommunications Americas, vol. 38, No. 13, Dec. 1, 2004, 2 pages.
Satya Shah et al., "Technology Selection for Human Behaviour Modelling in Contact Centres," Cranfield University, 2006, pp. 1-29.
http://www.economist.com/news/science-and-technology/21578357-planassess-peoples-personal-characteristics-their-twitter-streams-no, "No Hiding Place: A Plan to Assess People's Personal Characteristics from their Twitter-Streams," May 25, 2013, 3 pages.
WIPO, PCT/US2004/025763, "International Search Report," Aug. 5, 2014, 3 pages.
WIPO, PCT/US2004/025763, "Written Opinion of the International Searching Authority," Aug. 5, 2014, 6 pages.

\* cited by examiner

SYSTEM AND METHODS FOR ANALYZING MULTICHANNEL COMMUNICATIONS INCLUDING VOICE DATA

CROSS-REFERENCE TO RELATED APPLICATION

This application is a continuation of U.S. patent application Ser. No. 15/224,002, filed Jul. 29, 2016, now allowed, which is a continuation of U.S. patent application Ser. No. 14/808,092, filed Jul. 24, 2015, now U.S. Pat. No. 9,407,768, which is a continuation of U.S. patent application Ser. No. 13/828,864, filed Mar. 14, 2013, now U.S. Pat. No. 9,191,510, the contents of each which is hereby incorporated herein in its entirety by express reference thereto.

TECHNICAL FIELD

The present disclosure relates generally to a method and system for analyzing electronic communication data and generating a responsive communication, and more particularly to applying a psychological behavioral model to such electronic customer communication data and generating a responsive communication based on that behavioral assessment data.

BACKGROUND OF THE DISCLOSURE

It is known to use call centers to facilitate the receipt, response and routing of incoming telephonic communications relating to customer service and sales. Generally, a customer communicates via telephone with a customer service representative ("CSR") or contact center agent who is responsible for responding to customer inquiries and/or directing the customer to an appropriate individual, department, information source, or service as required to satisfy the customer's needs.

It is also well known to monitor calls and other electronic communications between a customer and a call center. Accordingly, call centers typically employ individuals responsible for listening to the conversation, or monitoring other types of electronic communications, between a customer and an agent. Many companies have in-house call centers to respond to customer complaints and inquiries. In many cases, however, it has been found to be cost effective for a company to use a third party call center to handle such inquiries. Call centers may be located thousands of miles away from a company's location or a customer. This often results in inconsistent and subjective methods of monitoring, training and evaluating contact center agents. These methods also may vary widely from call center to call center.

For typical call centers, call monitoring may occur in real time. In some instances, call centers may accumulate data for later review. Information gathered by a call center is typically used to provide a corrective response, to monitor agents of a call center and to identify possible training needs. Based on the review and analysis of the incoming data, a monitor can make suggestions or recommendations to improve the quality of the customer interaction.

Accordingly, there is a need in the field of customer relationship management ("CRM") for an objective tool useful in improving the quality of customer interactions with agents, and ultimately customer relationships. In particular, a need exists for an objective monitoring and analysis tool which provides information about a customer's perception of an interaction with a service. In the past, post-interaction data collection methods have been used to survey callers for feedback. Although such surveys have enjoyed some degree of success, their usefulness is directly tied to a customer's willingness to provide data after an interaction.

Recently, there has arisen an increase in the use of electronic mail, social media data feeds and web data and other electronic customer communication data. Conventional call centers do not account for the collection of this type of customer commentary regarding the quality of products or services. As such, a need has arisen for an objective tool useful for monitoring and analyzing not only telephonic communications, but also electronic data transmissions.

Certain psychological behavioral models have been developed as tools to evaluate and understand how and/or why one person or a group of people interacts with another person or group of people. The Process Communication Model® ("PCM") developed by Dr. Taibi Kahler is an example of one such behavioral model. Specifically, PCM presupposes that all people fall primarily into one of six basic personality types: Reactor, Workaholic, Persister, Dreamer, Rebel and Promoter. Although each person is one of these six types, all people have parts of all six types within them arranged like a "six-tier configuration." Each of the six types learns differently, is motivated differently, communicates differently, and has a different sequence of negative behaviors in which they engage when they are in distress. Importantly, each PCM personality type responds positively or negatively to communications that include tones or messages commonly associated with another of the PCM personality types. Thus, an understanding of a communicant's PCM personality type offers guidance as to an appropriate responsive tone or message. There exists a need for a system and method that analyzes the underlying behavioral characteristics of customer and agent communications by automatically applying a psychological behavioral model such as, for example PCM, to collected electronic data.

The embodiments described herein should overcome one or more of the deficiencies of conventional systems and methods.

SUMMARY

Various embodiments of a first aspect of the present disclosure include the following. In a first embodiment, the disclosure encompasses a method for analyzing electronic customer communication data, generating behavioral assessment data and generating a responsive communication, that includes receiving, by a server, electronic customer communication data of two or more types, wherein the server is configured to provide a user interface including a web site, web portal, or virtual portal, and wherein at least one of the two or more types of electronic customer communication data includes social media data, update status, media feed, social media review, social media data stream, social media profile or social media account setup, determining customer identification data associated with the electronic customer communication data by the server, analyzing the electronic customer communication data by applying a predetermined linguistic-based psychological behavioral model to the electronic customer communication data, generating behavioral assessment data by the contact center based on said analyzing, the behavioral assessment data providing a personality type for the analyzed electronic customer communication data, generating a responsive communication based on the generated behavioral assessment data, and providing the responsive electronic communication via the user interface.

In a second embodiment, the disclosure encompasses a customer-responsive computer program product stored on a non-transitory computer readable medium including computer executable code for analyzing electronic customer communication data, generating behavioral assessment data and generating a responsive communication, where the computer program product includes instructions that, when executed, receive, by a server, electronic customer communication data of two or more types, wherein the server is configured to provide a user interface including a web site, web portal, or virtual portal, and wherein at least one of the two or more types of electronic customer communication data includes social media data, update status, media feed, social media review, social media data stream, social media profile or social media account setup, determine customer identification data associated with the electronic customer communication data by the server, analyze the electronic customer communication data by applying a predetermined linguistic-based psychological behavioral model to the electronic customer communication data, generate behavioral assessment data by the contact center based on said analyzing, the behavioral assessment data providing a personality type for the analyzed electronic customer communication data, generate a responsive communication based on the generated behavioral assessment data, and provide the responsive electronic communication via the user interface.

In a third embodiment, the disclosure encompasses a method for analyzing electronic customer communication data, generating behavioral assessment data and generating a responsive communication, that includes receiving, by a server, electronic customer communication data of two or more types, wherein the server is configured to provide a user interface including a web site, web portal, or virtual portal, and wherein at least one of the two or more types of electronic customer communication data includes social media data, update status, media feed, social media review, social media data stream, social media profile or social media account setup, identifying a customer associated with the electronic customer communication data received by the server, aggregating electronic customer communication data from one or more sources based on identification of the customer from the electronic customer communication data, analyzing the aggregated electronic customer communication data by applying a predetermined linguistic-based psychological behavioral model to the electronic customer communication data for that identified customer, generating behavioral assessment data by the contact center based on said analyzing, the behavioral assessment data providing a personality type for the analyzed electronic customer communication data, generating a responsive communication based on the generated behavioral assessment data, and providing the responsive electronic communication via the user interface.

In a fourth embodiment, the disclosure encompasses a system configured to analyze customer communications and provide a responsive communication based on behavioral data from the customer communications, that includes a node including a processor and a non-transitory computer readable medium operably coupled thereto, the non-transitory computer readable medium including a plurality of instructions stored in association therewith that are accessible to, and executable by, the processor, where the plurality of instructions includes instructions, that when executed, receive by the processor electronic customer communication data of two or more types, wherein the server is configured to provide a user interface including a web site, web portal, or virtual portal, and wherein at least one of the two or more types of electronic customer communication data includes social media data, update status, media feed, social media review, social media data stream, social media profile or social media account setup, determine customer identification data associated with the electronic customer communication data by the processor, analyze the electronic customer communication data by applying a predetermined linguistic-based psychological behavioral model to the electronic customer communication data, generate behavioral assessment data by the contact center based on said analyzing, the behavioral assessment data providing a personality type for the analyzed electronic customer communication data, generate a responsive communication based on the generated behavioral assessment data, and provide the responsive electronic communication via the user interface.

Various embodiments of a second aspect are now described. According to one embodiment, a method is provided for analyzing electronic customer communication data of one or more types. Electronic mail data, electronic social media data, and web content data (including internet survey data, blog data, microblog data, on line video data, discussion forum data and chat data), SMS data, VOIP data, and other electronic customer content data and voice data from telephonic communications. Once electronic customer communication data is received, customer identification data associated with the electronic customer communication data is determined by the contact center the data, and the data is analyzed by mining the data and applying a predetermined linguistic-based psychological behavioral model to the data. According to one embodiment of the present method, behavioral assessment data is generated based on analyzing the electronic communication data. The generated behavioral assessment data includes a personality type corresponding to the analyzed electronic communication data.

According to another embodiment, a method of analyzing an electronic customer communication data includes aggregating electronic customer communication data. In some embodiments, aggregated electronic customer communication data may be used to generate a text file. The aggregated electronic communication data may be analyzed by mining the text file and applying a predetermined linguistic-based psychological behavioral model to the text file. Behavioral assessment data is generated based on analyzing the aggregated electronic communication data. The generated behavioral assessment data includes a personality type corresponding to the analyzed aggregated electronic communication data.

According to another embodiment, a method of analyzing social media data is provided. Once social media data is received, the social media data can be analyzed by mining the social media data and applying a predetermined linguistic-based psychological behavioral model to the mined social media data. Behavioral assessment data is generated based on the step of analyzing the electronic communication data. The generated behavioral assessment data includes a personality type corresponding to the analyzed electronic communication data.

According to another embodiment, a method of analyzing a telephonic communication between a first communicant to the telephonic communication and a second communicant to the telephonic communication is provided. The method may include employing one or more types of electronic customer communication data with voice data to generate behavioral assessment data. The telephonic communication is separated into at least first and second constituent voice data. The first constituent voice data is generated by the first communicant and the second constituent voice data is generated by the second communicant. The separated first and second constituent voice data is analyzed by mining the separated first and second constituent voice data and applying a predetermined linguistic-based psychological behavioral model to the separated first and second constituent voice data. Behavioral assessment data is generated that includes a personality type corresponding to the analyzed constituent voice data based on the step of analyzing one of the first and second constituent voice data.

According to one embodiment, either or both of the first and second constituent voice data is aggregated with the electronic communication data (i.e., one or more of the electronic mail data, electronic social media data, and web content data), and the text file is generated from the aggregation. According to one embodiment, a text file is generated that includes a textual translation of at least one of the first and second constituent voice data before the analyzing step, the analyzing step being performed on the text file.

In yet another embodiment, a method is provided for analyzing electronic customer communication data and generating behavioral assessment data. The method can include receiving electronic customer communication data by a contact center, determining customer identification data associated with the electronic customer communication data by the contact center, analyzing the electronic customer communication data by applying a predetermined linguistic-based psychological behavioral model to the electronic customer communication data. The method may also include generating behavioral assessment data by the contact center based on said analyzing, the behavioral assessment data providing a personality type for the analyzed electronic customer communication data, and outputting a notification including the behavioral assessment data by the contact center based on detection of the customer identification data.

The methods described above can be embodied in a non-transitory computer readable medium adapted to control an executable computer readable program code for implementing one or more of the methods therein. The computer program would include code segments or routines to enable all of the functional aspects of the interface described or shown herein.

According to still another embodiment of the above aspects, the computer program also includes a code segment for generating a graphical user interface ("GUI"). The GUI can also be embodied in a computer program stored on computer readable media. The computer program would include code segments or routines to enable all of the functional aspects of the interface described or shown herein.

Various embodiments of a third aspect are now described. In one embodiment, the present disclosure encompasses a customer analysis method for analyzing electronic customer communication data and generating behavioral assessment data, which method includes: receiving a plurality of types of electronic customer communication data by one or more servers configured to provide a user interface that includes a web site, web portal, or virtual portal or application, wherein at least one of the types of electronic communication data includes voice data, generating a text file from the voice data, identifying a customer associated with the electronic communication data received by the one or more servers, generating behavioral assessment data for the electronic communication data for that identified customer by analyzing the customer's electronic communication data, and displaying instructions to a user via a reporting engine, wherein the instructions are based on the generated behavioral assessment data, wherein the user includes the identified customer or a customer service agent.

In a second embodiment, the present disclosure encompasses a behavioral assessment computer program product stored on a non-transitory computer readable medium including computer executable code for analyzing electronic customer communication data, generating behavioral assessment data and displaying instructions to a user, where the computer program product includes instructions that, when executed: receive, by one or more servers, a plurality of types of electronic customer communication data configured to provide a user interface comprising a web site, web portal, or virtual portal or application, wherein at least one of the types of electronic communication data includes voice data; generate, by the one or more servers, a text file from the voice data; identify, by the one or more servers, a customer associated with the electronic communication data received by the one or more servers; generating, by the one or more servers, behavioral assessment data for the electronic communication data for that identified customer by analyzing the customer's electronic communication data; and display instructions to a user via a reporting engine, wherein the instructions are based on the generated behavioral assessment data, wherein the user includes the identified customer or a customer service agent.

In a third embodiment, the present disclosure encompasses a system configured to analyze customer communications and display instructions to a user based on behavioral assessment data from the customer communications, which system includes: a node that includes a processor and a non-transitory computer readable medium operably coupled thereto, the non-transitory computer readable medium including a plurality of instructions stored in association therewith that are accessible to, and executable by, the processor, where the plurality of instructions includes: instructions that, when executed, receive a plurality of types of electronic customer communication data configured to provide a user interface comprising a web site, web portal, or virtual portal or application, wherein at least one of the types of electronic communication data includes voice data; instructions that, when executed, generate a text file from the voice data; instructions that, when executed, identify a customer associated with the electronic communication data received by the processor; instructions that, when executed, generate behavioral assessment data for the electronic communication data for that identified customer by analyzing the customer's electronic communication data; and instructions that, when executed, display instructions to a user via a reporting engine, wherein the instructions are based on the generated behavioral assessment data, wherein the user includes the identified customer or a customer service agent.

Other features and advantages will be apparent from the following specification taken in conjunction with the following drawings.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
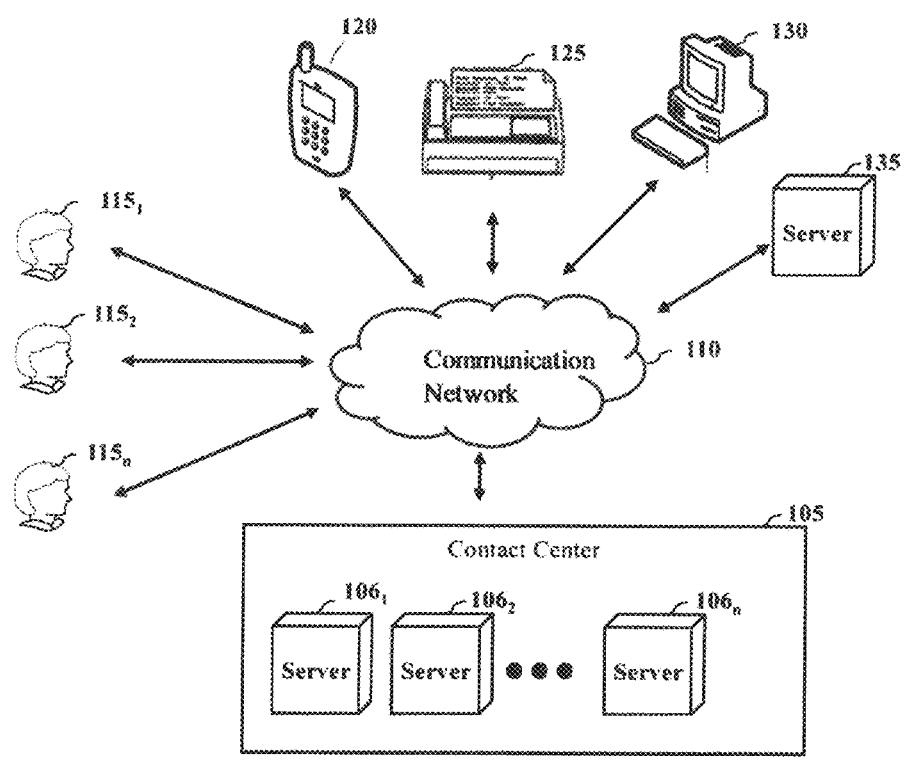
FIG. 1 is a simplified system diagram according to one or more embodiments.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified system diagram of a system including contact center 105 according to one or more embodiments. As shown in FIG. 1, contact center 105 may include one or more servers, such as servers $106_{1-n}$ for receiving electronic customer communication data.

A "contact center" as used herein can include any facility or system server suitable for receiving and recording electronic communications data from customers. In one embodiment, electronic customer communication data can include, for example, telephone calls, facsimile transmissions, web interactions, voice over IP ("VoIP"), and video data with contact center 105. According to another embodiment, electronic customer communication data is at least one of electronic-mail data, web content data, text message data, voice over IP data, and online forum data received by contact center 105. In certain embodiments, electronic customer communication data may include social media data, such as one or more of an update status, media feed, social media review, and a social media data stream. According to another embodiment, electronic customer communication data may be provided by a customer during communication with contact center 105, the electronic customer communication data being associated with one or more of a pop-up window message, computer display, and application window and graphical user interface for the contact center. Contact center 105 may be configured to aggregate electronic customer communication data from one or more channels and generate behavioral assessment data based on the aggregated data.

Contact center 105 may be configured to receive electronic customer communication data from customers via one or more channels, or mediums, in order to allow for multi-channel input of customer data and interactions. As shown in FIG. 1, contact center 105 may interface with one or more of customers $115_{1-n}$ via communication network 110. According to another embodiment, contact center 105 may receive electronic customer communication data from one or more devices, such as mobile communication device 120, fax machine 125, computer 130 and server 135. Communications with contact center 105 via communication network 110 may be transmitted by and through any type of telecommunication device and over any medium suitable for carrying data. For example, the communications may be transmitted by or through telephone lines, network cable or wireless communications.

In certain embodiments, electronic customer communication data may be received by one or more of servers $106_{1-n}$ of contact center 105 based on a user interface provided contact center 105. By way of example, contact center 105 may provide a user interface, such as a web site or web portal that may be accessed for providing one or more of telephonic communications relating to one or more of customer service, customer satisfaction, customer preference, customer retention, and sales. In some embodiments, servers $106_{1-n}$ of contact center 105 may each be configured to capture specific channels. In other embodiments, contact center 105 may communicate with a server, such as server 135, configured to provide a user interface of customer interaction. One or more of servers $106_{1-n}$ and server 135 may be configured to provide a virtual portal or user interface for contact center 105. In certain embodiments, server 135 may be a third-party server configured to receive electronic customer communication data, and to transmit the received electronic customer communication data to contact center 105. By way of example, server 135 may be a third-party server hosting a network service (e.g., web based service, social media service, etc.) configured to collect and store customer data. In some instances, server 135 may be associated with a social media service. As will be discussed in more detail below, contact center 105 may be configured to monitor and/or analyze electronic customer communication data received form server 135. In one embodiment, analysis of the electronic customer communication data received from server 135 may be used by contact server 105 to evaluate and monitor server 135.

Contact center 105 may be configured to receive and record varying electronic communications and data formats that represent an interaction with one or more customers. Each type of electronic customer communication may relate to a channel. Accordingly, by receiving one or more types of electronic customer communication data behavioral assessment data may be generated for multichannel applications. In certain embodiments, the method for analyzing an electronic communication between a customer and a contact center can be implemented by a computer program. In more specific terms, computer hardware associated contact center 105 may be operating on or more computer programs that may be used in connection with embodiments described herein.

Contact center 105 may be configured to provide customer service resources for one or more entities (e.g., company, corporation, government entity, utility, voice and/or data service providers, broadcasters, etc.). In certain embodiments, contact center 105 may be associated with a particular entity. In other embodiments, contact center 105 may be provided by a third-party for providing customer service to a plurality of entities.

As shown in FIG. 1, contact center 105 may interface with one or more customers $115_{1-n}$. As used herein, a "customer" may be a purchaser or registered user of a service, an entity acting on behalf of a purchaser or registered user of service, an unregistered user of service, and/or entity communicating with contact center 105. Contact center 105 may be configured to track and/or store contact information, identifying information, and electronic customer communication data for one or more customers.

Figure 2:
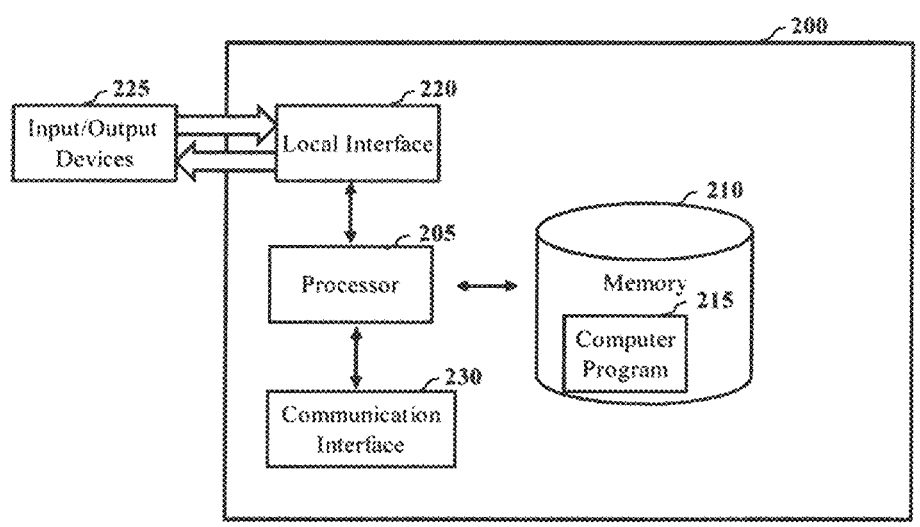
FIG. 2 is a simplified block diagram of a computing device according to one or more embodiments.

FIG. 2 is a simplified block diagram of a computing device according to one or more embodiments. Computing device 200 may be configured to receive electronic customer communication data and generate behavioral assessment data according to one or more embodiments. For purposes of understanding the hardware as described herein, the terms "computer" and "server" have identical meanings and are interchangeably used. Computing device 200 includes processor 205, and memory 210 storing a computer program product 215. As shown in FIG. 2, computing device 200 additionally includes local interface 220 and communication interface 230. Processor 205 can be a hardware device for executing software, including computer program 215 stored in memory 210. Processor 205 can be a custom made or commercially available processor, a central processing unit (CPU), an auxiliary processor among several processors associated with the computing device 200, a semiconductor based microprocessor (in the form of a microchip or chip set), a macroprocessor, or generally any device for executing software instructions.

According to one or more embodiments, memory 210 can include any one, or combination of, volatile memory elements (e.g., random access memory (RAM, such as DRAM, SRAM, SDRAM, etc.)) and nonvolatile memory elements (e.g., ROM, hard drive, tape, CDROM, etc.). Moreover, memory 210 may incorporate electronic, magnetic, optical, and/or other types of storage media. In some embodiments, memory 210 may have a distributed architecture where various components are situated separate from, or remote from, one another, but can be accessed by the processor 205. Memory 210 can include one or more separate programs, each of which having an ordered listing of executable instructions for implementing logical functions. For example, memory 210 can include computer program 215 and one or more programs for providing an operating system (O/S). Computer program product 215 can be implemented in software (e.g., firmware), hardware, or a combination thereof. Computer program 215 may be a control system, a source program, executable program (object code), script, or any other non-transitory computer readable code comprising instructions to be performed. When computing device 200 is in operation, the processor 205 is configured to execute software stored within the memory 210, to communicate data to and from the memory 210, and to generally control operations of the computing device 200 pursuant to the software.

In one embodiment, computer program 215 may be implemented in software and may be stored on any non-transitory computer readable medium for use by or in connection with any computer related system or method. In the context of this document, a "computer-readable medium" can be any non-transitory means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). In another embodiment, computer program 215 may be implemented in hardware by one or more of a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

I/O devices 225 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 225 may also include output devices, for example but not limited to, a printer, bar code printers, displays, etc. I/O devices 225 may further include devices that communicate both inputs and outputs, for instance but not limited to, a modulator/demodulator (modem; for accessing another device, system, or network), a radio frequency (RF) or other transceiver, a telephonic interface, a bridge, a router, etc. In certain embodiments processor 205 of computing device 200 may include communication interface 230 for communication with one or more or other devices via wired and/or wireless communication. Communication interface 230 may be configured to allow for communication with via a communication network (e.g., communication network 110 of FIG. 1).

Figure 3:
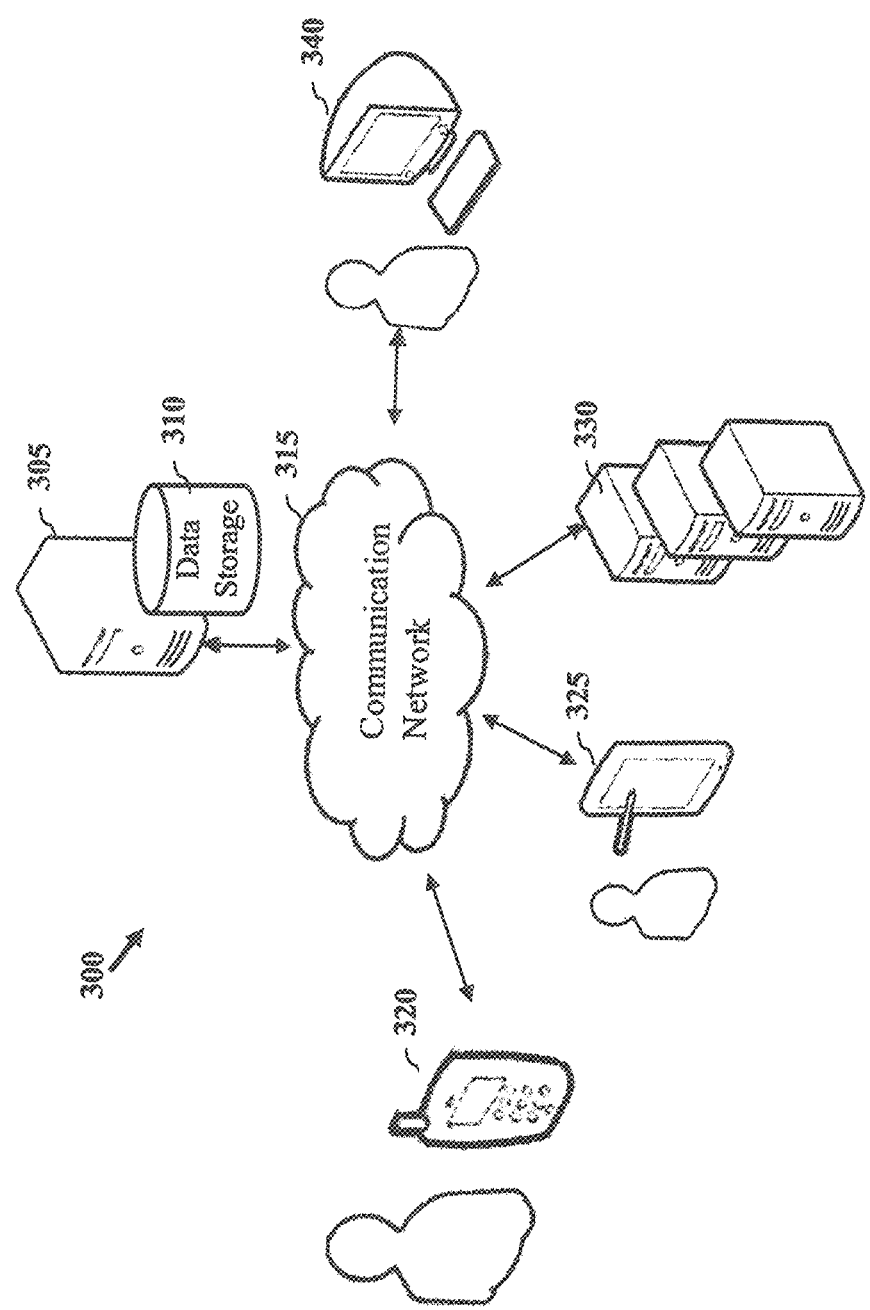
FIG. 3 is a simplified diagram according to one or more embodiments.

Referring now to FIG. 3, a simplified system diagram is shown according to one or more embodiments. According to one embodiment, system 300 includes server 305 configured to receive electronic customer communication data. Server 305 may be associated with a contact center (e.g., contact center 105 of FIG. 1) and may be configured to receive communications of one or more types (e.g., multichannel) from customers and/or electronic data sources via communication network 315. As shown in FIG. 3, system 300 includes server 305, associated with a contact center, however, it should be appreciated that system 300 may include a plurality of servers associated with a contact center. In certain embodiments, server 305 may be located within a contact center. In other embodiments, server 305 may be a shared server (e.g., cloud sever, etc.) configured to provide data to a contact center. Server 305 may be configured to receive and store electronic customer data in data storage 310, which may include one or more memory storage devices. In certain embodiments, data storage 310 may be distributed storage. According to one embodiment, server 305 may analyze electronic customer communication data received from one or more channels. As such, multi-channel electronic customer communication data may be received, stored, and/or analyzed for one or more customers.

Server 305 may be configured to communicate with one or more devices, such as mobile device 320, computing device 325, servers 330 and/or personal computing device 340. As will be discussed below, electronic communication data, from these devices may be received by server 305 and analyzed based on the type of communication employed. By allowing for multiple channels of communication with server 305, a plurality of data types may be used to generate behavioral assessment data for a user.

According to one embodiment, devices for communicating with server 305, such as device 325, may be smart computing devices. Smart computing devices can be computing devices such as laptop or desktop computers, smart-phones, PDAs, portable media players, tablet computers, televisions or other displays with one or more processors coupled thereto or embedded therein, or other appropriate computing devices that can be used to for displaying a web page or web application.

In one embodiment, server 305 can include a network address for receiving electronic customer communication data over communication network 315. By way of example, a contact center may have one or more contact numbers (e.g., telephone, text messaging, short message service (SMS), multimedia message service (MMS), etc.) or network addresses (e.g., email, electronic messaging, voice over IP, IP address, etc.). Customers may communicate with contact center 305 by sending one or more messages to the contact center. In some cases, electronic communication data may be initiated by a customer regarding a request for service, a change to service, information for an account, and/or to speak with an agent associated with a service.

According to another embodiment, a contact center may receive electronic customer data from one or more third-party servers. Servers 330 may be third-party servers, such as servers responsible for hosting a social networking site, including calendar functions, message boards, synchronous communications, forum discussions and the like. Servers 3330 can also be responsible for sending and receiving electronic messages to devices 320, 325 and 340 via communication network 315 (for example, a LAN, WAN, WiFi, or the Internet) or causing such messages to be sent. Servers 330 also may be configured to provide one or more application programming interfaces (APIs) for the integration of mobile-to-web extension applications.

Servers 330 may be configured to provide a user interface (e.g., website, portal, etc.) for customers to access data for accounts and/or service. In one embodiment, servers 330 may be social media servers including accounts for the social media service of customers and one or more accounts for a contact center. Servers may allow for customers to interact with the profile or account setup by the contact center via one or more applications or programs run by servers 330. Server 305 may be configured to receive data for one or more accounts of the contact center on servers 330 and via one or more application programming interfaces (APIs). In certain embodiments, server 305 may be configured to fetch data. In other embodiments, server 305 may be configured to receive pushed data.

According to another embodiment, one or more of devices 320, 325 and 340 may include applications (e.g., apps) that are dedicated for providing a user interface on the device for communicating and receiving data from server 305. In addition to providing electronic customer communication data, the applications may provide identification of a customer or user of a device, usage details, metadata, application interaction data, etc.

According to one or more embodiments, behavioral assessment data may be generated by analyzing electronic customer communication data. Analyzing electronic customer communication data and generating behavioral assessment data are discussed below with reference to FIGS. 4-10. According to one or more embodiments, electronic customer communication data can be one or more of electronic mail data, electronic social media data, and web content data electronic mail data, electronic social media data, and web content data (including internet survey data, blog data, micro-blog data, on line video data, discussion forum data, chat feed data), SMS data, VOIP data, and other electronic customer content data and voice data generated during a telephonic communication.

Figure 4:
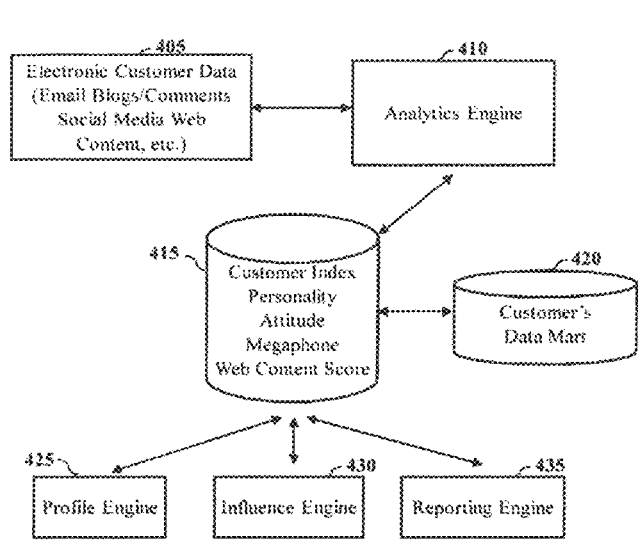
FIG. 4 is a schematic diagram illustrating a process of analyzing electronic communication data in accordance with one or more embodiments.

In FIG. 4, a schematic diagram illustrates a process of analyzing electronic communication data in accordance with one or more embodiments. In one embodiment, electronic customer communication data can be received at block 405. At block 410, an analytics engine can analyze the electronic customer communication data received at block 405, which can include one or more of mining data from the communication, converting data in the communication to a file, determining the sender of the data, identifying a customer associated with the data, determining the reason for the data being sent, identifying the type of communication that is being sent, aggregating data, etc. In certain embodiments, analyzing at block 410 may include applying one or more behavioral models to electronic customer communication data. A behavioral model may apply one or more analytic engines for detecting behavioral signifiers, detecting customer interests and personality types.

In block 415, electronic customer communication data may be stored based on one or more attributes or fields of interest. As shown in FIG. 4, electronic customer communication data may be profiled for storage at block 415 based on one or more of customer index, personality, attitude, megaphone, and a web content score. For example, data may be characterized by one or more profile fields. It should be appreciated however, that other types of profile information may be employed at block 415. Based on profile information determined at block 415, data may be generated or added to provide a data mart for customers. By way of example, data determined for a particular customer may be stored and/or associated with a particular customer profile at block 420. Customer profiles may be assigned one or more identification numbers, including but not limited to an account number, mobile communication number, etc. In certain embodiments, customer data stored at block 420 may be based on one or more network communication addresses employed for contacting a contact center.

According to another embodiment, data profiled at block 415 may be provided to one or more of a profile engine at block 425, influence engine at block 430, and reporting engine at block 435 for generating and outputting behavioral assessment data. The profile engine at block 425 may be configured to match electronic customer communication data to one or more profiles. The influence engine at block 430 may be configured to assess the relevancy of electronic customer communication data. For example, influence engine 430 may select or discard recent or previously stored electronic customer communication data based on the relevancy to a particular series of events or an incoming communication from a customer. The reporting engine at block 435 may be configured to generate reports of electronic customer communication data.

Figure 5:
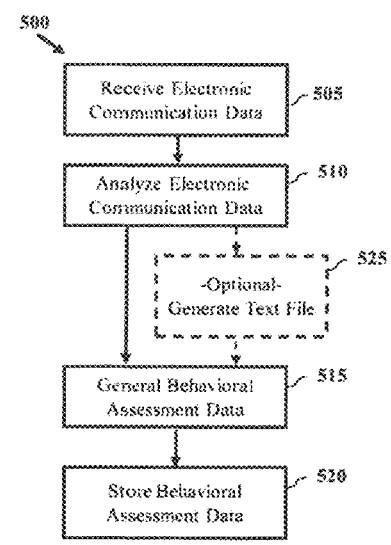
FIG. 5 is a method of analyzing electronic communication data according to one or more embodiments.

Referring now to FIG. 5, a method of analyzing electronic communication data is shown according to one or more embodiments. Process 500 of FIG. 5 may be employed by a contact center, and/or performed by one or more servers associated with a contact center. Process 500 may be initiated by receiving electronic customer communication data at block 505. In one embodiment, electronic customer communication data at block 505 can include one or more of a telephone call, facsimile transmission, web interaction, voice over IP ("VoIP") data, and video data received by one or more servers associated with a contact center. According to another embodiment, electronic customer communication data is at least one of electronic-mail data, web content data, text message data, voice over IP data, and online forum data received by one or more servers associated with a contact center. In certain embodiments, electronic customer communication data at block 505 may include social media data, such as one or more of an update status, media feed, social media review, and a social media data stream. Electronic customer communication data received at block 505 may be from one or more channels. As will be discussed below, the electronic customer communication data from one or more channels may be multi-channel data (e.g., received from one or more channels and/or source types), which can be aggregated to generate behavioral and/or analytic data by one or more servers of a contact center.

According to another embodiment, electronic customer communication data may be provided by a customer during communication with contact center, the electronic customer communication data being associated with one or more of a pop-up window message, computer display, and application window and graphical user interface for the contact center. By way of example, electronic customer communication data can be generated by a computer or mobile device operated by a user to communicate with the contact center. In certain cases, an application on the customers device, such as an application for monitoring an account and paying bills for a service associated with the contact center, can transmit electronic customer communication to a server associated with a contact center.

At block 510, process 500 analyzes the electronic customer communication data received at block 505. Analysis of electronic customer communication data may be performed by one or more servers of a contact center. In one embodiment, electronic customer communication data is analyzed at block 510 by mining the data and applying a predetermined linguistic-based psychological behavioral model to the electronic communication data. For examiner, the electronic customer communication data may be mined to determine the purpose of the communication, customer activity associated with the contact center, a type of transaction, behavioral signifiers, etc. Analysis at block 510 may include identifying or determining the type of communication in which the electronic customer communication data is associated with. As will be discussed in more detail below with reference to FIG. 6, electronic customer communication data identified with a customer may be stored and/or aggregated. Process 500 may include one or more servers of a contact center determining customer identification data associated with the electronic customer communication data. Analysis at block 510 of the electronic customer communication data is associated may be based on the type of data detected. For example, for certain types of communication, a behavior model may assess the criteria based on one or more signifiers particular to the communication type.

Analysis at block 510 may include determining identifying indicia of a customer and/or a behavioral signifier in the electronic customer data. Table 2 provides behavioral signifiers (i.e., words) that may be associated with a corresponding behavioral type in the PCM Model according to one or more embodiments.

Behavioral assessment data is generated at block 515. In one embodiment, process 500 generates behavioral analysis data based on the analysis of received electronic customer communication data at block 515 and data mined from the communication. As will be discussed below, behavioral assessment data, generated by one or more servers of the contact center, includes a personality type corresponding to the analyzed electronic communication data. Behavioral assessment data generated by process 500 may be employed by the contact center in one or more ways. In one embodiment, behavioral assessment data may be employed by the contact center to assist customers. As will be discussed in more detail below with respect to FIG. 9, one or more notifications of behavioral data may be output to an agent of a contact center to provide the context of a customer's interaction with a contact center and intent for contacting a contact center. According to another embodiment, behavioral assessment generated by process 500 may be employed for one or more analytics to monitor a customer agent of a contact center, third party service provided of the contact center and the customer service of the contact center as a whole. The behavioral assessment data can allow for monitoring effectiveness of a contact center agent, third party call center, etc., by providing performance metrics rating the effectiveness based on a behavioral model and/or one or more performance management criteria. In addition to monitoring effectiveness, behavioral assessment data can provide output data characterizing one or more of customer satisfaction, ability to correct customer needs, and improvements to customer service.

In another embodiment, multiple forms of electronic communication data are received at block 505 and aggregated at block 510. A text file may optionally be generated from aggregated electronic customer communication data at block 525. The aggregated electronic communication data can be analyzed by mining the text file and applying a predetermined linguistic-based psychological behavioral model to the text file at block 525. Behavioral assessment data may then generated based on the aggregated electronic communication data.

According to another embodiment, a psychological behavioral model used to analyze the electronic customer communication data is the Process Communication Model® ("PCM") developed by Dr. Taibi Kahler. PCM is a psychological behavioral analytic tool which presupposes that all people fall primarily into one of six basic personality types: Reactor, Workaholic, Persister, Dreamer, Rebel and Promoter. Although each person is one of these six types, all people have parts of all six types within them arranged like a six-tier configuration. Each of the six types learns differently, is motivated differently, communicates differently, and has a different sequence of negative behaviors they engage in when they are in distress. Importantly, according to PCM, each personality type of PCM responds positively or negatively to communications that include tones or messages commonly associated with another of the PCM personality types. Thus, an understanding of a communicant's PCM personality type offers guidance as to an appropriate responsive tone or message or wording.

According to the PCM Model, behavioral characteristics are associated with the respective personality types. For example, Table 1 provides behavioral characteristics that may be associated with a corresponding behavioral type in the behavioral model employed by process 500.

TABLE 1

| Process Communication Model (PCM) Personality Type | Behavioral Characteristics |
|---|---|
| Reactors | compassionate, sensitive, and warm; great "people skills" and enjoy working with groups of people |
| Workaholics | responsible, logical, and organized |
| Persisters | conscientious, dedicated, and observant; tend to follow the rules and expect others to follow them |
| Dreamers | reflective, imaginative, and calm |
| Rebels | creative, spontaneous, and playful |
| Promoters | resourceful, adaptable, and charming |

The behavioral characteristics of Table 1 may be categorized by words, tones, gestures, postures and facial expressions, and can be observed objectively with significantly high interjudge reliability.

Behavioral assessment data may be based on comparison of the electronic customer communication data to one or more libraries of data, wherein one or more words or phrases can be evaluated. For example, behavioral data generated at block 515 may assess a level of distress, wherein electronic customer communication data including the term "manager" will escalate the communication. In that fashion, a language based model may be applied to customer communications. The model may apply linguistic analysis to received data to create one or more structures evaluating the customer, communication and contact center.

Behavioral assessment data may be stored at block 520 by one or more servers associated with a contact center. In one embodiment, behavioral data may be stored based on one or more customer identifiers determined at block 510. According to another embodiment, behavioral assessment data may be stored at block 520 by associated the data with identifying indicia associated with a customer, such as one or more fields, profiles, identification numbers, account numbers, email addresses, source identifier of the communication type, IP addresses, and unique identifier associated with app. As will be discussed in more detail below with respect to FIG. 9, behavioral assessment data generated based on electronic customer communication data, such as behavioral assessment data by process 500, may be output. For example, a notification may be output including the behavioral assessment data by the contact center based on detection of the customer identification data.

Behavioral data may be generated in real-time, or near real-time. In other embodiments, analysis and/or generation of behavioral data may be post processed.

According to one embodiment, behavioral assessment data stored at block 520 may be used to for assessment of customers and a contact center. In certain embodiments, for example, the behavioral assessment data may be used to rate ability of customer service rep, interactive voice response (IVR), etc.

According to one embodiment, one or more methods are provided for analyzing social media data. Accordingly, process 500 of FIG. 5 may analyze social media data to generate behavioral assessment data. By way of example, social media data may be received at block 505 and analyzed at block 510 by mining the social media data and applying a predetermined linguistic-based psychological behavioral model to the mined social media data. Behavioral assessment data may be generated at block 515 based on the analyzing of block 510. The behavioral assessment data generated at block 515 can include a personality type corresponding to the analyzed electronic communication data. It will be understood that electronic communications received in accordance with any of the methods described may be either actively retrieved from a source or transmitted by a source. Social media data may also include one or more of captured image/video data, and employee data.

Figure 6:
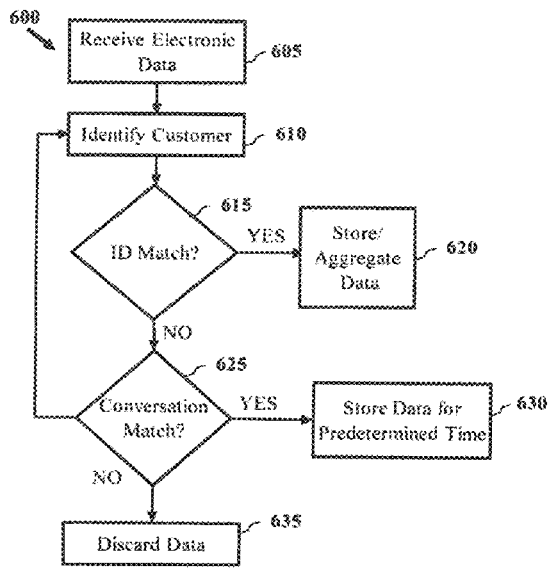
FIG. 6 is a flowchart depicting analysis of electronic customer communication data according to one or more embodiments.

FIG. 6 is a flowchart depicting analysis of electronic customer communication data according to one or more embodiments. Process 600 may be employed by a contact center, and/or performed by one or more servers associated with a contact center. Process 600 of FIG. 6 may be initiated by receiving electronic customer communication data at block 605. At block 610, process 600 includes analyzing the electronic customer communication to identify a customer based on the data received at block 605. Identification of the customer at block 610 may include determining one or more of a customer identification number, such as a number identifying customers of the contact center and one or more identifiers associated with the electronic customer communication data type. Identifiers of the electronic customer communication data type may include a network address (e.g., IP address, email address, network login, etc.), device number (telephone/mobile device number), and identification numbers in general. In certain embodiments, when a customer transmits electronic customer communication data via a network based application, such as application or via a web address associated with the contact center the customer identification may be determined from the contacts of the communication and/or the metadata associated with the transmission. When electronic customer communication data is associated with a social media source, a customer for the electronic customer communication data may be identified based on a social media identification, or handle for employed for the communication. Customer identification may be determined based on one or more of customer lists, assuming customer identification, matching received data to a customer identification table, user login data, and metadata associated with electronic customer communication data. In certain embodiments, identification of a customer at block 610 may be auto generated based on the type of communication, content of the communication and source. In that fashion a uniform type of identifying customers may be applied to aid in matching data.

At decision block 615, process 600 determines if customer identification determined at block 610 matches one or more customer identifiers. In certain embodiments, a contact center may store electronic customer communication data based on a customer identifier. One or more customer identifiers may be associated with the same customer. For example, a particular customer may be identified based on one or more of a telephone number, account number, email address, service code, etc. When the contact center determines an identifier match at block 615 (e.g., "YES" path out of decision block 615), the electronic customer communication data can be stored at block 620. Storing data at block 620 may include storing data for only one customer, or in some cases storing the electronic customer communication data for more than one customer. When the contact center does not determine an identifier match at block 615 (e.g., "NO" path out of decision block 615), process 600 may include determining if the electronic customer communication data matches a conversation at block 625. Storing data at block 620 may include storing data for only one customer or, in some cases, storing the electronic customer communication data for more than one customer.

According to another embodiment, process 600 may include storing and/or aggregating data at block 620. Aggregating the data at block 620 may include combining at least a portion of the received electronic customer communication data with other received electronic customer communication data. For example, text provided by a customer in a text communication (e.g., text message, email, etc.) may be aggregated with voice data received associated with a separate electronic customer communication data. In that fashion, analysis using a behavioral model or generation of behavioral assessment data may be based on aggregated electronic customer communication data. Aggregating electronic customer communication data at block 620 may be from one or more sources based on identification of a customer from the electronic customer communication data. Aggregating at block 620 may include aggregating voice data with the electronic customer communication data. By way of example, electronic customer communication data, such as an email in some embodiments, may be analyzed with voice data associated with one or more constituents to generate behavioral data for a customer.

A conversation match at block 625 may be determined by comparing one or more of the content of electronic customer communication data and metadata of the electronic customer communication data to previously received electronic customer communication data. For example, electronic customer communication data may relate to a web based chat (e.g., text conversation via pop-up window on a website) associated with the contact center, wherein text of the conversation (e.g., electronic customer communication data) can be matched with text during a previous conversation based on the details of the conversation, network addresses or even customer service agent associated with the electronic customer communication data. When the contact center determines a conversation match at block 625 (e.g., "YES" path out of decision block 625), the electronic customer communication data can be stored at block 630 for a predetermined time. Storage of the customer communication data for a predetermined time may allow for matching the data to other electronic customer communication data to determine a customer identifier. When the contact center does not determine a conversation match at block 625 (e.g., "NO" path out of decision block 625), the electronic customer communication can be discarded at block 635.

Figure 7:
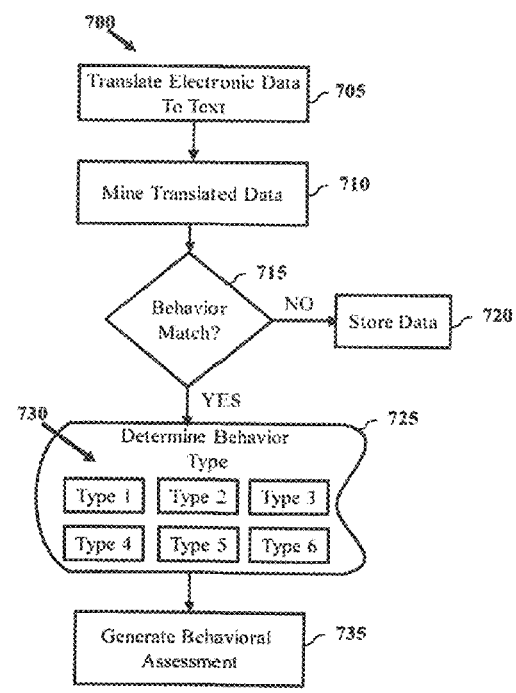
FIG. 7 is a flowchart depicting analysis of electronic customer communication data according to one or more embodiments.

Referring now to FIG. 7, a flowchart is shown depicting analysis of electronic customer communication data according to one or more embodiments. Process 700 may be employed by a contact center, and/or performed by one or more servers associated with a contact center. According to one embodiment, process 700 includes applying an analytic tool to received and/or stored electronic customer communication data. Process 700 of FIG. 7 may be initiated by translating electronic customer communication data to text at block 705. The translated electronic data may be mined at block 710 for behavioral signifiers. According to one embodiment, the electronic customer communication data is mined for significant words at block 710.

Mined electronic customer communication data may be compared to a system database at decision block 715 to determine a behavior match. According to one embodiment, determining a behavior match at decision block 715 includes applying a behavior model, such as PCM, to the identified words. For example, Table 2 provides behavioral signifiers (i.e., words) that may be associated with a corresponding behavioral type in the PCM Model according to one or more embodiments.

TABLE 2

| PROCESS COMMUNICATION MODEL (PCM) PERSONALITY TYPE | BEHAVIORAL SIGNIFIERS |
| --- | --- |
| Reactors | Emotional Words |
| Workaholics | Thought Words |
| Persisters | Opinion Words |
| Dreamers | Reflection Words |
| Rebels | Reaction Words |
| Promoters | Action Words |

Determining a behavioral match at decision block 715 can include executing the identified behavioral signifier against a system database which maintains all of the data related to the psychological behavioral model. When a behavioral signifier does not match a behavior type (e.g., "NO" path out of decision block 715), the behavioral signifier and electronic customer communication data may be stored at block 720. When a behavioral signifier includes a behavior match (e.g., "YES" path out of decision block 715), the behavior type may be determined at block 725. According to one embodiment, the behavior type may be determined at block 725 based on the behavioral signifiers identified in the electronic communication data, and predetermined algorithm to decipher a linguistic pattern that corresponds to one or more of the PCM personality types. More specifically, the present method mines for linguistic indicators (words and phrases) that reveal the underlying personality characteristics of the electronic communicant during periods of distress. According to one embodiment, determining a behavior type at block 725 may be based on six personality types, generally referred to as 730 in FIG. 7. It should be appreciated, however, that determining a behavior type at block 725 may be based on additional, or fewer, personality types.

The resultant behavioral assessment data is stored at block 735 (e.g., in a database) so that it may subsequently be used to comparatively analyze against behavioral assessment data derived from analysis of responsive communications. According to one embodiment, generating behavioral assessment data at block 735 includes consideration of word segment patterns of all communicants as a whole to refine the behavioral assessment data of each electronic communicant, making sure that the final behavioral results are consistent with patterns that occur in human interaction. Alternatively, raw behavioral assessment data generated at block 735 may be used to evaluate qualities of a single communicant (e.g., the customer or agent behavioral type, etc.). The results generated by analyzing electronic customer communication data through application of a psychological behavioral model can be graphically illustrated through a GUI.

According to another embodiment, process 700 may be repeated when electronic customer communication data is received. For example, when additional electronic customer communication data is received, behavioral assessment data maybe re-calculated or generated based on the additional data. Alternatively, when a different type of electronic customer communication data is received, such as electronic customer communication data from another channel than originally received, the electronic customer communication data may be aggregated to prior to mining translation data or generating behavioral assessment data.

It should be noted that, although one preferred embodiment uses PCM as a linguistic-based psychological behavioral model, any known linguistic-based psychological behavioral model be employed. In addition, more than one linguistic-based psychological behavioral model can be used to analyze an electronic communication.

According to one embodiment, the generated behavioral assessment data at block 735 is associated with at least one identifying indicia and stored. For example, the identifying indicia can be a name, e-mail address, account number, or other indicia sufficient to identify the source of the behavioral assessment data. In this way, the behavioral data corresponding to at least one identifying indicia and being made available for subsequent analysis.

According to another embodiment, responsive electronic communication data to the electronic communication data can be automatically generated. For example, the responsive electronic communication can take the form of any responsive communication such as, for example, a responsive e-mail, electronic post, social media feed or telephonic response.

Figure 8:
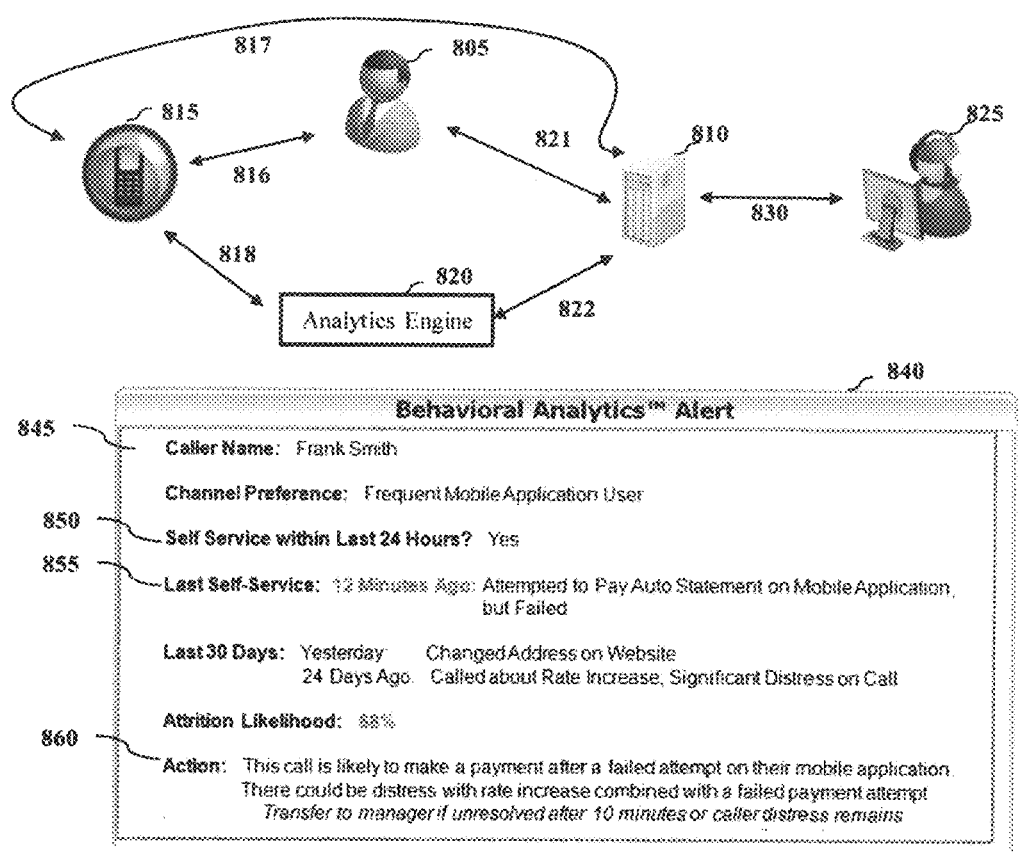
FIG. 8 is a graphical representation of providing a behavioral analytics alert according to one or more embodiments.

FIG. 8 is a graphical representation of providing a behavioral analytics alert according to one or more embodiments. According to one or more embodiments, it may be advantageous to provide an alert associated with customer interactions. For example, a contact center may be configured to provide an alert to an agent of a contact center, or CSR, during a communication session between the agent and customer. According to one embodiment, an alert may be generated and provided by a contact center, and/or performed by one or more servers associated with a contact center. Generating alerts may include using one or more of the methods and acts described herein with respect to receiving and analyzing electronic customer communication data.

An interaction of a customer 805 with server 810 and a device 815 forming multiple interactions with a contact center is depicted in FIG. 8. It should be appreciated that principles of the interactions depicted in FIG. 8 may be applied to one or more other embodiments described herein. As shown in FIG. 8, customer 805 may interact with device 815, which may mobile device, smart phone, tablet, etc., to interact with a contact center. By way of example, customer 805 may initiate action 816 to make a payment for a service to a contact center using device 815 which can initiate communication between device 815 and server 810 as shown by 817. The actions by the user may be considered an interaction. It should also be appreciated that other actions by a user with a contact center may relate to interactions. In certain embodiments, when the interaction with device 815 is associated with a web application or an application stored on device 815, data shown as 818 may be provided to an analytics engine 820 of the contact center. The analytics engine may analyze any electronic customer communication data provided to the contact center, such as by using the process described in FIGS. 5-7 above. Based on the interaction, analytics engine 820 can provide behavioral data to server 810. According to another embodiment, server 810 may automatically generate responsive electronic communications to electronic customer communication data received from customer 805. Automatically generated responsive electronic communications may include a displayed message on the device the user employed to transmit electronic customer communication data, and/or may be a return message based on the same type as received electronic customer communication data.

According to another embodiment, behavioral data may be stored and/or accessed by server 810 when customer 805 initiates contact with the contact server, as shown by 821. By way of example, customer 805 may initiate a communication 821 with a contact center when a payment via device 815 has failed. Based on communication 821, the contact center may connect customer 805 to an agent or CSR, such as agent 825. In one embodiment, the agent may be provided behavioral data, shown as 830, by server 810. Providing behavioral data for a customer to an agent of the contact center can provide context of a customer's interaction and intent with the contact center.

An exemplary alert is shown as 840, according to one or more embodiments. Alert 840 may provide information associated with the customer and customer's interactions with a contact center. As shown in FIG. 8, alert 840 includes customer identification 845 (e.g., caller name), an indication 850 whether self-service occurred in the last 24 hours, an indication 855 of the last time self-service was provided, and an instructions 860 for the agent. Indications shown in FIG. 8 for alert 840 are exemplary, and it should be appreciated that an alert may be configured to provide additional and/or different information.

Figure 9:
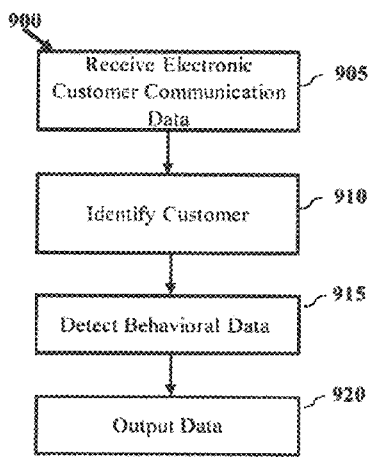
FIG. 9 is a flowchart depicting output of data based on received electronic customer communication data according to one or more embodiments.

Referring now to FIG. 9, a flowchart is depicted of outputting data based on received electronic customer communication data according to one or more embodiments. According to one or more embodiments, it may be advantageous to output behavioral data generated for a customer and/or agent of a contact center. For example, behavioral data for a customer may be output to a graphical user interface or display screen for use by an agent (e.g., CSR) during a telephone call to a contact center. According to another embodiment, behavioral data (e.g., alert 840) for a customer may be output to a graphical user interface or display screen for assessing and/or monitoring performance of a CSR. Process 900 may be employed by a contact center, and/or performed by one or more servers associated with a contact center. Process 900 may employ one or more of the methods and acts described herein with respect to receiving and analyzing electronic customer communication data.

Process 900 may be initiated by receiving electronic customer communication data at block 905. In certain embodiments, the electronic customer communication data may be received during a voice communication between a first constituent that is a customer, and a second constituent that is an agent of the contact center. Based on the received electronic customer communication data, a customer may be identified at block 910.

At block 910, for example, voice data associated with an audio waveform of the voice communication can be mined and analyzed using multi-stage linguistic and non-linguistic analytic tools. The analysis data can be stored and can be accessed by a user (e.g., CSR supervisor) through an interface portal for subsequent review. The digital stereo audio waveform is compressed and stored in an audio file which is held on a server for subsequent access through the interface portal. In one embodiment, audio compression is postponed until analysis of the audio data is complete. The delay allows the system to apply the analytic tools to a truer and clearer hi-fidelity signal. The system employed also minimizes audio distortion, increases fidelity, eliminates gain control and requires no additional filtering of the signal.

According to one embodiment, process 900 may search for behavioral data for the customer based at block 915 based on the identification at block 910. When behavioral data is detected at block 915, a graphical user interface may be configured to display or output the behavioral data. In one embodiment, the output of behavioral data, for example, may aide an agent of the contact center, such as a CSR, to assist the customer. In other embodiments, the behavior data may relate to the agent of the contact center and may be displayed to a manager of the agent at the CSR for evaluating performance and monitoring. In other embodiments, the data output may be associated with the contact centers agent in order to provide the agent with feedback of their performance.

Figure 10:
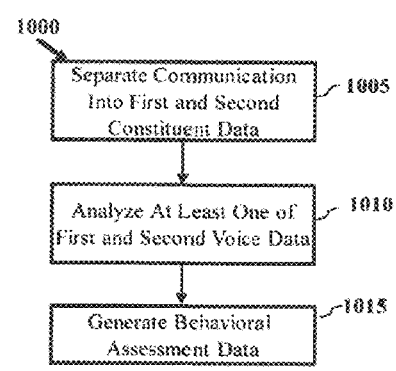
FIG. 10 is a flowchart depicting analysis of electronic customer communication data according to one or more embodiments.

FIG. 10 is a flowchart depicting analysis of electronic customer communication data according to one or more embodiments. Process 1000 may be employed by a contact center, and/or performed by one or more servers associated with a contact center. According to one embodiment, process 1000 includes generating behavioral assessment data to received and/or stored electronic customer communication data. In particular, FIG. 10 illustrates a general flow for analyzing voice data generated during a telephonic communication including separating a telephonic communication into first constituent voice data and second constituent voice data.

Process 1000 of FIG. 10 may be initiated by separating electronic customer communication data to text at block 1005. For example, an uncompressed digital stereo audio waveform of a conversation between a customer and a contact center agent is recorded and separated into customer voice data and contact center agent voice data at block 1005.

At block 1010, one of the first or second constituent voice data is then separately analyzed by applying a predetermined psychological behavioral model thereto to generate behavioral assessment data. In one embodiment discussed below, linguistic-based behavioral models are adapted to assess behavior based on behavioral signifiers within a communications are employed. One or more psychological behavioral models may be applied to the voice data to generate behavioral assessment data at block 1015.

According to one embodiment, telephonic communications analyzed by process 1000 can be one of numerous calls stored within a contact center server, or communicated to a contact center during a given time period. Accordingly, the telephonic communication being subjected to analysis is selected from the plurality of telephonic communications. The selection criteria for determining which communication should be analyzed may vary. For example, the communications coming into a contact center can be automatically categorized into a plurality of call types using an appropriate algorithm, such as a word-spotting algorithm that categorizes communications into particular types or categories based on words used in the communication. In one embodiment, each communication is automatically categorized as a service call type (e.g., a caller requesting assistance for servicing a previously purchased product), a retention call type (e.g., a caller expressing indignation, or having a significant life change event), or a sales call type (e.g., a caller purchasing an item offered by a seller). In one scenario, it may be desirable to analyze all of the "sales call type" communications received by a contact center during a predetermined time frame. In that case, the user would analyze each of the sales call type communications from that time period by applying the predetermined psychological behavioral model to each such communication.

Alternatively, telephonic communications may be grouped according to customer categories, and the user may desire to analyze the communications between the contact center and communicants within a particular customer category. For example, it may be desirable for a user to perform an analysis only of a "platinum customers" category, consisting of high end investors, or a "high volume distributors" category comprised of a user's best distributors.

According to another embodiment, electronic customer communication data and behavioral assessment data can be employed to assist with voice communications. By way of example, behavioral assessment data generated for a customer may be output by a contact center to an agent to better assist the customer during a voice communication with the contact center. FIGS. 11-14 discuss one or more embodiments of analyzing voice communication data and generating behavioral assessment data. It should be appreciated that the embodiments described above may be applied to and/or aggregated with voice and behavioral data for voice communication.

Figure 11A:
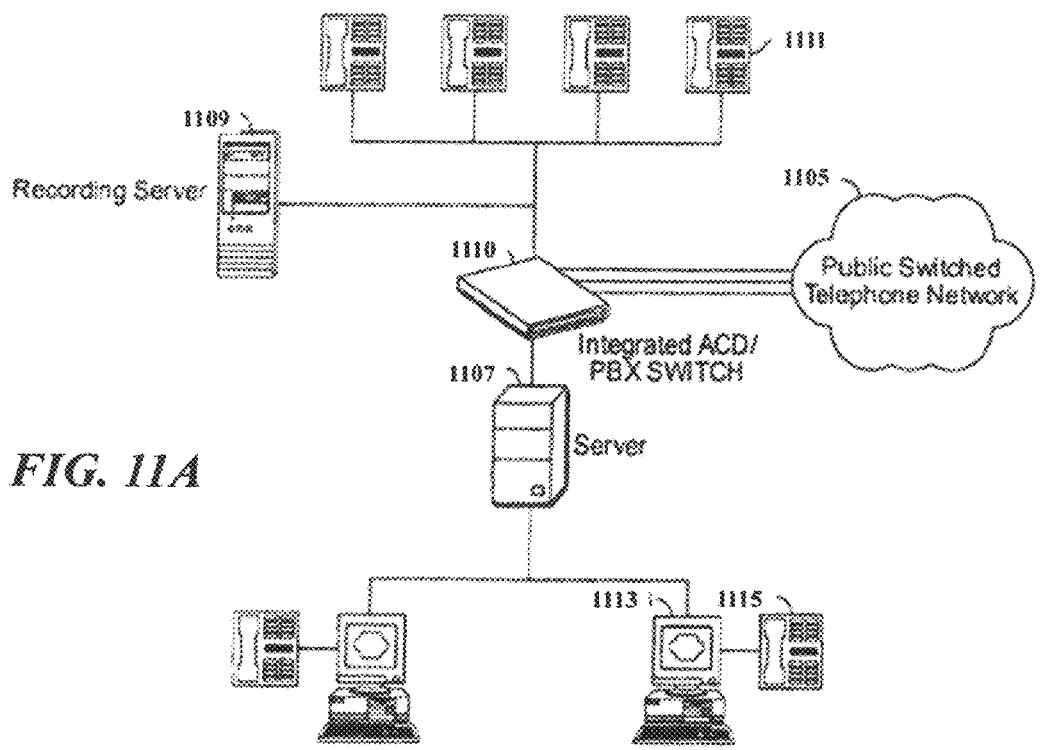
FIGS. 11A-11B are schematic diagrams of a telephonic communication system according to one or more embodiments.
Figure 11B:
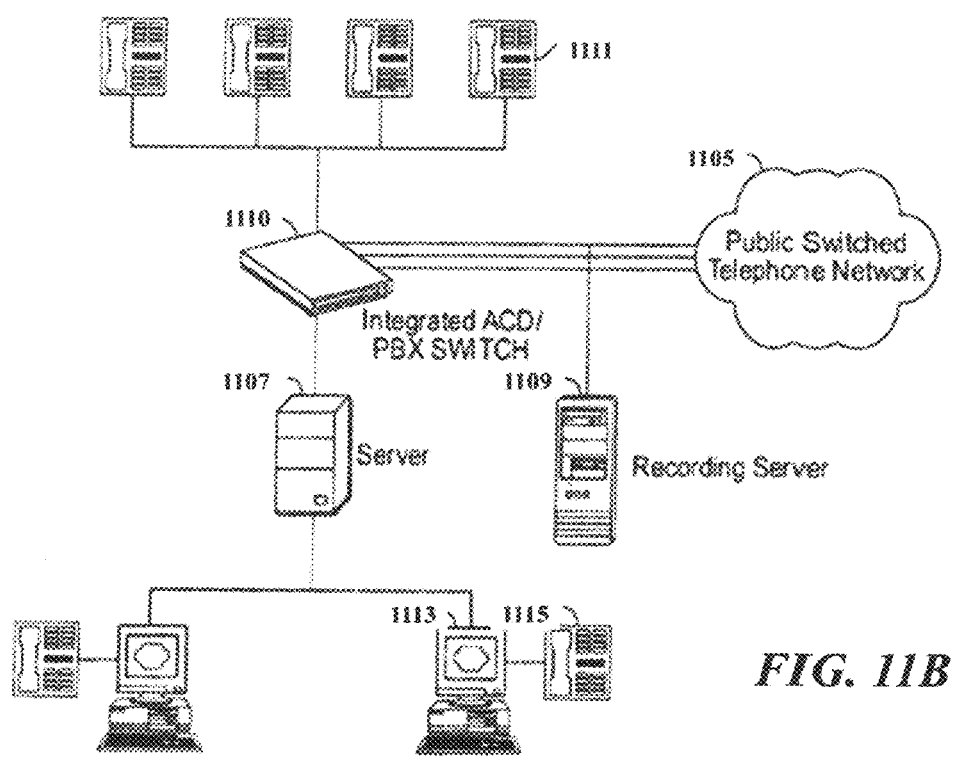
Figure 11C:
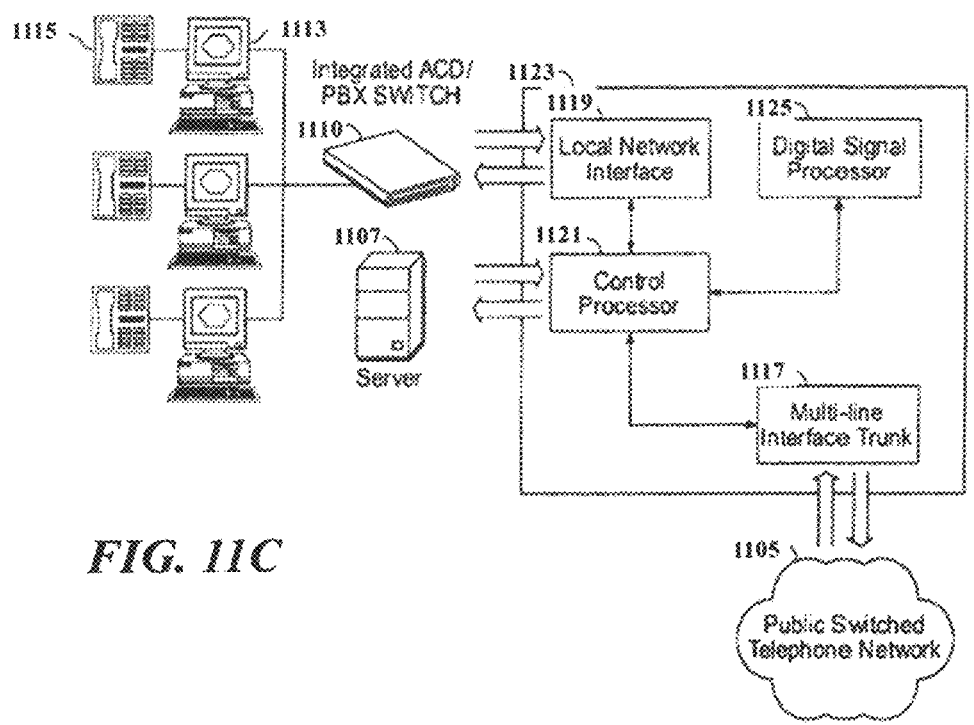
FIG. 11C is a schematic diagram of a telephonic communication system with a multi-port PSTN module according to one or more embodiments.

FIGS. 11A-11C are schematic diagrams of a telephonic communication system according to one or more embodiments. The telephonic communication system of FIGS. 11A-11B include a distributed private branch exchange (PBX), having a public switched telephone network (PSTN) 1105 connected to the PBX through a PBX switch 1110. With respect to FIGS. 11A-11B, telephonic communications may be a telephone call in which a telephonic signal is transmitted. The telephonic system including various types of communication devices connected to the network, including the telephony server 1107, a recording server 1109, telephone stations 1111, and client personal computers 1113 equipped with telephone stations 1115.

As shown in FIG. 11A, a recording server 1109 is coupled to PBX switch 1110. In FIG. 11B, recording server 1109 is coupled between a public switched telephone network (PSTN) 1105 and a PBX switch 1110. As may be seen in FIGS. 11A-11B, a customer sending a telephonic signal may access a contact center through the public switched telephone network (PSTN) 1105 and an automatic call distribution system (PBX/ACD) 1110 directs the communication to one of a plurality of agent work stations, each agent work station including, for example, a computer 1113 and a telephone 1115. According to one embodiment, when analyzing voice data, it is preferable to work from a true and clear hi-fidelity signal. This is true both in instances in which the voice data is being translated into a text format for analysis using a linguistic-based psychological behavioral model thereto, or in instances in which a linguistic-based psychological behavioral model is being applied directly to an audio waveform, audio stream or file containing voice data.

The PBX switch 1110 provides an interface between the PSTN 1105 and a local network. Preferably, the interface is controlled by software stored on a telephony server 1107 coupled to the PBX switch 1110. The PBX switch 1110, using interface software, connects trunk and line station interfaces of the public switch telephone network 1105 to stations of a local network or other peripheral devices. Further, in another embodiment, the PBX switch may be integrated within telephony server 1107. The stations may include various types of communication devices connected to the network, including the telephony server 1107, a recording server 1109, telephone stations 1111, and client personal computers 1113 equipped with telephone stations 1115. The local network may further include fax machines and modems.

Generally, in terms of hardware architecture, the telephony server 1107 includes a processor, memory, and one or more input and/or output (I/O) devices (or peripherals) that are communicatively coupled via a local interface. The processor can be any custom-made or commercially available processor, a central processing unit (CPU), an auxiliary processor among several processors associated with the telephony server 1107, a semiconductor based microprocessor (in the form of a microchip or chip set), a macroprocessor, or generally any device for executing software instructions. The memory of the telephony server 1107 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 1107 may further include a keyboard and a mouse for control purposes, and an attached graphic monitor for observation of software operation.

The telephony server 1107 incorporates PBX control software to control the initiation and termination of connections between stations and via outside trunk connections to the PSTN 1105. In addition, the software may monitor the status of all telephone stations 1111 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module and PCs to implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

FIG. 11C is a schematic diagram of a telephonic communication system with a multi-port PSTN module according to one or more embodiments. In one embodiment, the telephony server 1107 is equipped with multi-port PSTN module 1123 having circuitry and software to implement a trunk interface 1117 and a local network interface 1119. The PSTN module 1123 comprises a control processor 1121 to manage the transmission and reception of network messages between the PBX switch 1110 and the telephony network server 1107. The control processor 1121 is also capable of directing network messages between the PBX switch 1110, the local network interface 291, the telephony network server 1107, and the trunk interface 1117. In the one embodiment, the local network uses Transmission Control Protocol/Internet Protocol (TCP/IP). The network messages may contain computer data, telephony transmission supervision, signaling and various media streams, such as audio data and video data. The control processor 1121 directs network messages containing computer data from the PBX switch 1110 to the telephony network server 1107 directly through the multi-port PSTN module 1123.

The control processor 1121 may include buffer storage and control logic to convert media streams from one format to another, if necessary, between the trunk interface 1117 and local network. The trunk interface 1117 provides interconnection with the trunk circuits of the PSTN 1105. The local network interface 1119 provides conventional software and circuitry to enable the telephony server 1107 to access the local network. The buffer RAM and control logic implement efficient transfer of media streams between the trunk interface 1117, the telephony server 1107, the digital signal processor 1125, and the local network interface 1119.

The trunk interface 1117 utilizes conventional telephony trunk transmission supervision and signaling protocols required to interface with the outside trunk circuits from the PSTN 1105. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 1121 manages real-time telephony event handling pertaining to the telephone trunk line interfaces, including managing the efficient use of digital signal processor resources for the detection of caller ID, DTMF, call progress and other conventional forms of signaling found on trunk lines. The control processor 1121 also manages the generation of telephony tones for dialing and other purposes, and controls the connection state, impedance matching, and echo cancellation of individual trunk line interfaces on the multi-port PSTN module 1123.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 1121 to the telephony server 1107 to notify the PBX software in the telephony server 1107 of real-time telephony events on the attached trunk lines. Network messages are received from the PBX Switch 1110 to implement telephone call supervision and may control the set-up and elimination of media streams for voice transmission.

The local network interface 1119 includes conventional circuitry to interface with the local network. The specific circuitry is dependent on the signal protocol utilized in the local network. In one embodiment, the local network may be a local area network (LAN) utilizing IP telephony. IP telephony integrates audio and video stream control with legacy telephony functions and may be supported through the H.323 protocol. H.323 is an International Telecommunication Union—Telecommunications protocol used to provide voice and video services over data networks. H.323 permits users to make point-to-point audio and video phone calls over a local area network. IP telephony systems can be integrated with the public telephone system through a local network interface 1119, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 1105 is routed to the IP/PBX-PSTN gateway and translates the conventional telephone protocol to H.323 protocol.

As noted above, PBX trunk control messages are transmitted from the telephony server 1107 to the control processor 1121 of the multi-port PSTN. In contrast, network messages containing media streams of digital representations of real-time voice are transmitted between the trunk interface 1117 and local network interface 1119 using the digital signal processor 1125. The digital signal processor 1125 may include buffer storage and control logic. Preferably, the buffer storage and control logic implement a first-in-first-out (FIFO) data buffering scheme for transmitting digital representations of voice audio between the local network to the trunk interface 1117. It is noted that the digital signal processor 1125 may be integrated with the control processor 1121 on a single microprocessor.

The digital signal processor 1125 may include a coder/decoder (CODEC) connected to the control processor 1121. The CODEC may be a type TCM29c13 integrated circuit made by Texas Instruments, Inc. In one embodiment, the digital signal processor 1125 receives an analog or digital voice signal from a station within the network or from the trunk lines of the PSTN 1105. The CODEC converts the analog voice signal into a digital from, such as digital data packets. It should be noted that the CODEC is not used when connection is made to digital lines and devices. From the CODEC, the digital data is transmitted to the digital signal processor 1125 where telephone functions take place. The digital data is then passed to the control processor 1121 which accumulates the data bytes from the digital signal processor 1125. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 1119. Among other information, the data packet contains a source address, a destination address, and audio data. The source address identifies the location the audio data originated from and the destination address identifies the location the audio data is to be sent.

The system permits bi-directional communication by implementing a return path allowing data from the local network, through the local network interface 1119, to be sent to the PSTN 1105 through the multi-line PSTN trunk interface 1117. Data streams from the local network are received by the local network interface 1119 and translated from the protocol utilized on the local network to the protocol utilized on the PSTN 1105. The conversion of data may be performed as the inverse operation of the conversion described above relating to the IP/PBX-PSTN gateway. The data stream is restored in appropriate form suitable for transmission through to either a connected telephone 1111, 1115 or an interface trunk 1117 of the PSTN module 1123, or a digital interface such as a T1 line or ISDN. In addition, digital data may be converted to analog data for transmission over the PSTN 1105.

The PBX switch 1110 may be implemented with hardware or virtually. A hardware PBX has equipment located local to the user of the PBX system. A virtual PBX has equipment located at a central telephone service provider and delivers the PBX as a service over the PSTN 1105.

The system includes a recording server 1109 for recording and separating network messages transmitted within the system. The recording server 1109 may be connected to a port on the local network. Alternatively, the recording server 1109 may be connected to the PSTN trunk line as illustrated in FIG. 11A. The recording server 1109 includes control system software, such as recording software. The recording software can be implemented in software (e.g., firmware), hardware, or a combination thereof. In one embodiment, the recording software is implemented in software, as an executable program, and is executed by one or more special or general purpose digital computer(s), such as a personal computer, personal digital assistant, workstation, minicomputer, or mainframe computer. An example of a general purpose computer that can implement the recording software is shown in FIG. 2. The recording software may reside in, or have portions residing in, any computer such as, but not limited to, a general purpose personal computer. Therefore, recording server 1109 of FIGS. 11A-11C may be representative of any type of computer in which the recording software resides or partially resides.

Generally, hardware architecture is the same as that discussed above and shown in FIG. 2. Specifically, the recording server 1109 includes a processor, memory, and one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

As noted above, the recording server 1109 incorporates recording software for recording and separating a signal based on the source address and/or destination address of the signal. The method utilized by the recording server 1109 depends on the communication protocol utilized on the communication lines to which the recording server 1109 is coupled. In the communication system, the signal carrying audio data of a communication between at least two users may be an analog signal or a digital signal in the form of a network message. In one embodiment, the signal is an audio data transmitted according to a signaling protocol, for example the H.323 protocol described above.

An example of a communication between an outside caller and a contact center agent utilizing the present system is illustrated in FIG. 11C and described herein. In the embodiment of FIG. 11C, when an outside caller reaches the system through the multi-line interface trunk 1117, their voice signal is digitized (if needed) in the manner described above, and converted into digital data packets according to the communication protocol utilized on the local network of the system. The data packet comprises a source address identifying the address of the outside caller, a destination address identifying the address of the contact center agent, and first constituent audio data comprising at least a portion of the outside caller's voice. The data packet can further comprise routing data identifying how the data packet should be routed through the system and other relevant data. Once the data packet is created, the data packet is sent to the appropriate destination on the local network, such as to a contact center agent, through the local network interface 1119. The PBX and/or an automatic call distributor (ACD) can determine the initial communication setup, such as the connection state, impedance matching, and echo cancellation, according to predetermined criteria.

Similar to the process described above, when the contact center agent speaks, their voice is digitized (if needed) and converted into digital data packet according to the communication protocol utilized on the local network. The data packet comprises a source address identifying the address of the contact center agent, a destination address identifying the address of the outside caller, and second constituent audio data comprising at least a portion of the contact center agent's voice. The data packet is received by the local network interface 1119 and translated from the communication protocol utilized on the local network to the communication protocol utilized on the PSTN 1105. The conversion of data can be performed as described above. The data packet is restored in appropriate form suitable for transmission through to either a connected telephone 1111, 1115 or an interface trunk 1117 of the PSTN module 1123, or a digital interface such as a T1 line or ISDN. In addition, digital data can be converted to analog data for transmission through the PSTN 1105.

The recording server 1109 receives either a data packet including: the source address identifying the address of the outside caller, a destination address identifying the address of the contact center agent, and the first constituent audio data comprising at least a portion of the outside caller's voice; or a data packet including a source address identifying the address of the contact center agent, a destination address identifying the address of the outside caller, and second constituent audio data comprising at least a portion of the customer's agent voice. It is understood by one of ordinary skill in the art that the recording server 1109 is programmed to identify the communication protocol utilized by the local network and extract the audio data within the data packet. In one embodiment, the recording server 1109 can automatically identify the utilized communication protocol from a plurality of communication protocols. The plurality of communication protocols can be stored in local memory or accessed from a remote database.

The recording server 1109 comprises recording software to record the communication session between the outside caller and the contact center agent in a single data file in a stereo format. The first data file has at least a first audio track and a second audio track. Once a telephone connection is established between an outside caller and a contact center agent, the recording software creates a first data file to record the communication between the outside caller and the contact center agent. The entire communication session or a portion of the communication session can be recorded.

In one embodiment, the recording server 1109, upon receiving the data packet, determines whether to record the audio data contained in the data packet in either the first audio track or the second audio track of the first data file as determined by the source address, destination address, and/or the audio data contained within the received data packet. Alternatively, two first data files can be created, wherein the first audio track is recorded to the one of the first data file and the second audio track is recorded to the second first data file. In one embodiment, if the data packet comprises a source address identifying the address of the outside caller, a destination address identifying the address of the contact center agent, and first constituent audio data, the first constituent audio data is recorded on the first audio track of the first data file. Similarly, if the data packet comprises a source address identifying the address of the contact center agent, a destination address identifying the address of the outside caller, and second constituent audio data, the second constituent audio data is recorded on the second audio track of the first data file. It should be noted the first and second constituent audio data can be a digital or analog audio waveform or a textual translation of the digital or analog waveform. The recording process is repeated until the communication link between the outside caller and contact center agent is terminated.

As noted above, the recording server 1109 can be connected to the trunk lines of the PSTN 1105 as seen in FIG. 8. The PSTN 1105 can utilize a different protocol and therefore, the recording server 1109 is configured to identify the communication protocol utilized by the PSTN 1105, recognize the source and destination address of a signal and extract the audio data from the PSTN 1105. The recording server 1109 is programmed in a manner as known to one of ordinary skill in the art.

Once the communication link is terminated, the recording server 1109 ends the recording session and stores the single data file having the recorded communication session in memory. After the first data file is stored in memory, the recording server 1109 can extract either or both of the first constituent audio data from the first audio track of the first data file or the second constituent audio data from the second audio track of the first data file. Extraction of constituent data is discussed below with reference to FIGS. 12-14.

It is known in the art that "cradle-to-grave" recording may be used to record all information related to a particular telephone call from the time the call enters the contact center to the later of: the caller hanging up or the agent completing the transaction. All of the interactions during the call are recorded, including interaction with an IVR system, time spent on hold, data keyed through the caller's key pad, conversations with the agent, and screens displayed by the agent at his/her station during the transaction.

Figure 12:
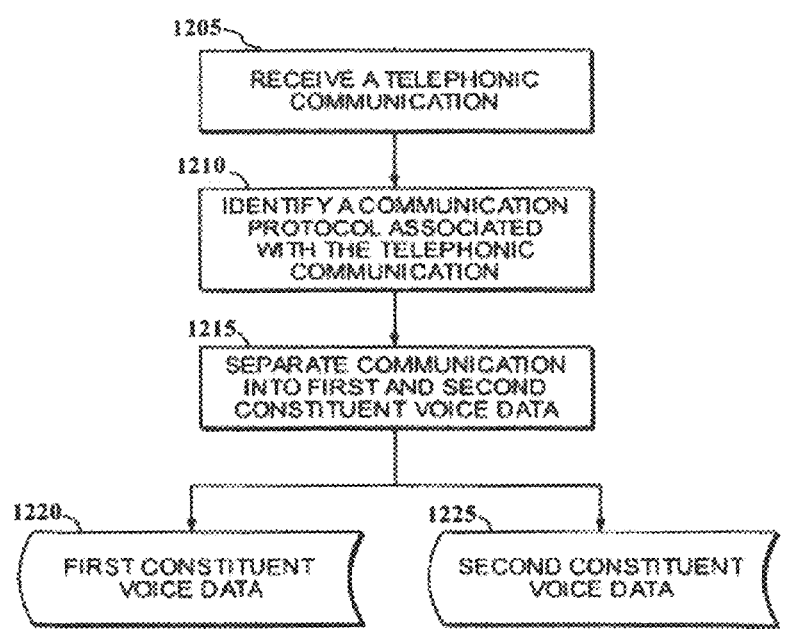
FIG. 12 is a flow chart illustrating a process of recording and separating a telephonic communication according to one or more embodiments.
Figure 13:
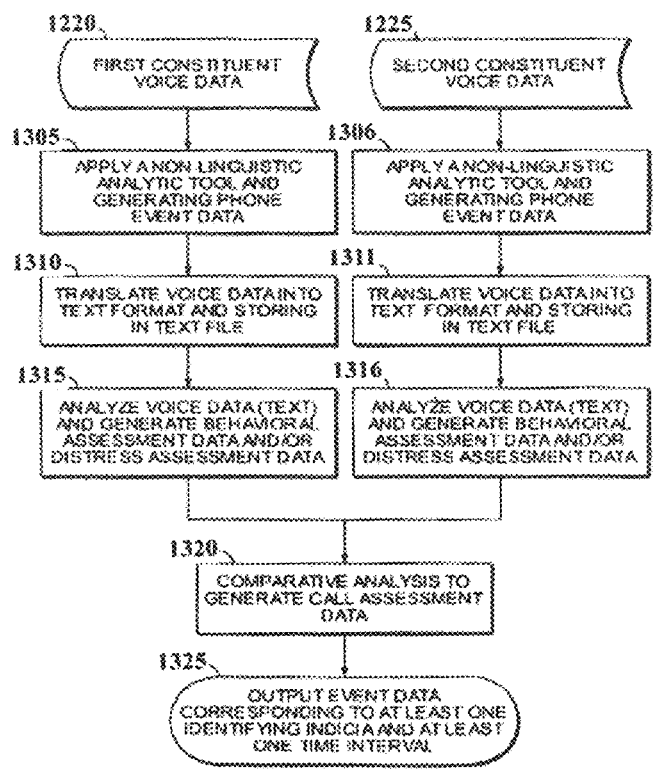
FIG. 13 is a flow chart illustrating a process of recording and separating a telephonic communication according to one or more embodiments.
Figure 14:
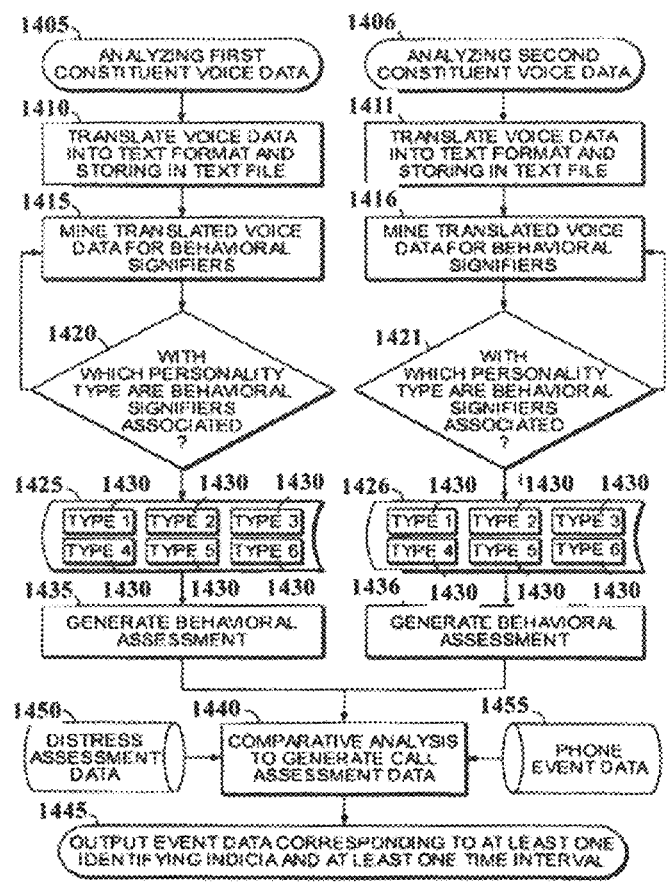
FIG. 14 is a flow chart illustrating a process of analyzing separated constituent voice data of a telephonic communication in according to one or more embodiments.

FIGS. 12-14 are directed to extraction and analysis of constituent data for voice communication. According to one embodiment, the extraction and analysis of voice data as described in FIGS. 12-14 can be supplemented by generation of behavioral data for electronic customer communication data discussed above. FIG. 12 is a flow chart illustrating a process of recording and separating a telephonic communication according to one or more embodiments. At block 1205, a telephonic communication can be received. A communication protocol associated with the telephonic communication can be identified at block 1210. At block 1205, the communication can be separated into first and second constituent voice data.

In one embodiment shown in FIGS. 12-13, the first constituent audio data extracted from the first audio track is stored in a first constituent data file 1220. Similarly, the second constituent audio data extracted from the second audio track can be stored in a second constituent data file 1225. The first and second constituent data files 1220 and 1225 can be compressed before being stored in memory. The extracted data can be in the form of a digital or analog audio waveform or can be a textual translation of the first or second constituent audio data. Either or both of the first constituent data file 1220 or the second constituent data file 1225 can be further analyzed or processed. For example, among other processes and analyses, filtering techniques can be applied to the first constituent data file and/or the second constituent data file. Moreover, event data, such as silence periods or over-talking, can be identified through analysis techniques known to those skilled in the art.

Further, the first constituent data file 1220 and second constituent data file 1225 can be merged together into a single second data file. The first and second constituent data files can be merged in a stereo format where the first constituent audio data from the first constituent data file 1220 is stored on a first audio track of the second data file and the second constituent audio data from the second constituent data file 1225 is stored on a second audio track of the second data file. Alternatively, the first and second constituent data files can be merged in a mono format where the first constituent audio data from the first constituent data file 1220 and the second constituent audio data from the second constituent data file 1225 are stored on a first audio track of the second data file. Additionally, the first and second constituent audio data can be merged into a document having a textual translation of the audio data. In such a case, identifiers can be associated with each of the merged first and second constituent audio data in order to associate the merged first constituent audio data with the outside caller, and associate the merged second constituent audio data with the contact center agent. The second data file can be compressed before being stored in memory.

As shown in FIGS. 13-14, once the first and second constituent voice data are separated one from the other, each of the first and second constituent voice data can be independently mined and analyzed. According to one embodiment, mining voice data can be considered part of the process of analyzing the constituent voice data. Mining and behavioral analysis can be conducted on either or both of the constituent voice data.

Even with conventional audio mining technology, application of linguistic-based disparities in dialect, phonemes, accents and inflections can impede or render burdensome accurate identification of words. And while mining and analysis in accordance with one or more embodiments can be applied directly to voice data configured in audio format, in a preferred embodiment, the voice data to be mined and analyzed is first translated into a text file.

According to another embodiment, the separated voice data is mined for behavioral signifiers associated with a linguistic-based psychological behavioral model. In particular, the method searches for and identifies text-based keywords (i.e., behavioral signifiers) relevant to a predetermined psychological behavioral model.

According to one embodiment, PCM is the psychological behavioral model used to analyze the voice data. According to one embodiment shown in FIG. 14, the system mines significant words within one or both of the separated first and second constituent voice data, and applies PCM to the identified words. In another embodiment, the present method mines for such significant words within the merged second data file described above, and apply PCM to the identified words. Alternatively, the first data file can be mined for significant words.

FIG. 13 is a flow chart illustrating a process of recording and separating a telephonic communication according to one or more embodiments. It may be desirable to analyze non-linguistic phone events occurring during the course of a conversation such as hold times, transfers, "dead-air," overtalk, etc. Accordingly, in one embodiment, phone event data resulting from analysis of these non-linguistic events is generated. Preferably, the phone event data is generated by analyzing non-linguistic information from both the separated constituent voice data, or from the subsequently generated audio file containing at least some of the remerged audio data of the original audio waveform. In addition, the phone event data can be generated before the audio waveform is separated.

Generally, call assessment data is comprised of behavioral assessment data, phone event data and distress assessment data. The resultant call assessment data may be subsequently viewed to provide an objective assessment or rating of the quality, satisfaction or appropriateness of the interaction between an agent and a customer. In the instance in which the first and second constituent voice data are comparatively analyzed, the call assessment data may generate resultant data useful for characterizing the success of the interaction between a customer and an agent.

In one embodiment, a non-linguistic based analytic tool can be separately applied to each of the separated first and second constituent voice data 1220 and 1225, and to generate phone event data corresponding to the analyzed voice data at blocks 1305 and 1306. The separated first and second constituent voice data 1220 and 1225 is translated into text format and stores the respective translated first and second constituent voice data in a first and second text file at blocks 1310 and 1311. The first and second text files are analyzed by applying a predetermined linguistic-based psychological behavioral model thereto at blocks 1315 and 1316. The code segment generates either or both of behavioral assessment data and distress assessment data corresponding to each of the analyzed first and second constituent voice data at blocks 1315 and 1316. The resulting behavioral assessment data from each of the analyzed first and second constituent voice data are comparatively analyzed at block 1320 in view of the parameters of the psychological behavioral model to provide an assessment of a given communication. From this comparative analysis, call assessment data relating to the totality of the call may be generated at block 1325.

FIG. 14 is a flow chart illustrating a process of analyzing separated constituent voice data of a telephonic communication in according to one or more embodiments. According to a one, both the first and second constituent voice data are analyzed at blocks 1405 and 1406, translated from voice to text data at blocks 1410 and 1411, and mined at blocks 1425 and 1426. Mined behavioral data is checked to see if behavioral signifiers are associated with types at blocks 1420 and 1421 and matched to types at blocks 1425 and 1426, in particular types 1430. The resulting behavioral assessment data generated at blocks 1435 and 1436, phone event data at block 1450 and distress assessment data 1450 from each of the analyzed first and second constituent voice data are comparatively analyzed in view of the parameters of the psychological behavioral model to provide an assessment of a given communication. From this comparative analysis, call assessment data relating to the totality of the call may be generated at block 1440 and output at block 1445.

As shown in FIG. 14, when a behavioral signifier is identified within the voice data at blocks 1415 and 1416, the identified behavioral signifier is executed against a system database that maintains all of the data related to the psychological behavioral model. Based on the behavioral signifiers identified in the analyzed voice data, a predetermined algorithm at blocks 1420 and 1421 is used to decipher a linguistic pattern that corresponds to one or more of the PCM personality types 1430. More specifically, the method of FIG. 14 mines for linguistic indicators (words and phrases) that reveal the underlying personality characteristics of the speaker during periods of distress. Non-linguistic indicators may also be identified to augment or confirm the selection of a style for each segment of speech. Looking at all the speech segments in conjunction with personality information the software determines an order of personality components for the caller by weighing a number of factors such as timing, position, quantity and interaction between the parties in the dialog.

The resultant behavioral assessment data at blocks 1435 and 1436 is stored in a database so that it may subsequently be used to comparatively analyze against behavioral assessment data derived from analysis of the other of the first and second constituent voice data at block 1440. The software considers the speech segment patterns of all parties in the dialog as a whole to refine the behavioral and distress assessment data of each party, making sure that the final distress and behavioral results are consistent with patterns that occur in human interaction. Alternatively, the raw behavioral assessment data at blocks 1435 and 1436 derived from the analysis of the single voice data may be used to evaluate qualities of a single communicant (e.g., the customer or agent behavioral type, etc.). The results generated by analyzing voice data through application of a psychological behavioral model to one or both of the first and second constituent voice data can be graphically illustrated as discussed in further detail below.

It should be noted that, although one preferred embodiment uses PCM as a linguistic-based psychological behavioral model, any known linguistic-based psychological behavioral model be employed, or more than one linguistic-based psychological behavioral model be used to analyze one or both of the first and second constituent voice data.

In addition to the behavioral assessment of voice data, the method may also employ distress analysis to voice data. As may be seen in FIG. 14, linguistic-based distress analysis is preferably conducted on both the textual translation of the voice data and the audio file containing voice data. Accordingly, linguistic-based analytic tools as well as non-linguistic analytic tools may be applied to the audio file. For example, one of skill in the art may apply spectral analysis to the audio file voice data while applying a word spotting analytical tool to the text file. Linguistic-based word spotting analysis and algorithms for identifying distress can be applied to the textual translation of the communication. Preferably, the resultant distress data is stored in a database for subsequent analysis of the communication.

The method and system is useful in improving the quality of customer interactions with agents and ultimately customer relationships. In use, a customer wishing to engage in a service call, a retention call or a sales will call into (or be called by) a contact center. When the call enters the contact center it will be routed by appropriate means to a contact center agent. As the interaction transpires, the voice data will be recorded as described herein. Either contemporaneously with the interaction, or after the call interaction has concluded, the recorded voice data will be analyzed as described herein. The results of the analysis will generate call assessment data comprised of behavioral assessment data, distress assessment data and phone event data. This data may be subsequently used by a supervisor or trainer to evaluate an agent, or take other remedial action such as call back the customer, etc. Also, graphical and pictorial analysis of the resultant call assessment data (and event data) will be accessible through a portal by a subsequent user (e.g., a supervisor, training instructor or monitor) through a graphical user interface.

A user of the system described above interacts with the system via a unique GUI. The GUI enables the user to navigate through the system to obtain desired reports and information regarding the caller interaction events stored in memory. The GUI can be part of a software program residing in whole or in part in a computing device, or it may reside in whole or in part on a server coupled to a computing device via a network connection, such as through the Internet or a local or wide area network (LAN or WAN). Moreover, a wireless connection can be used to link to the network.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A customer analysis method for analyzing electronic customer communication data and generating behavioral assessment data, which method comprises:
    receiving a plurality of types of electronic customer communication data by one or more servers configured to provide a user interface comprising a web site, web portal, or virtual portal or application, wherein at least one of the types of electronic customer communication data includes voice data, and at least one of social media data, update status, media feed, social media review, social media data stream, social media profile or social media account setup;
    generating a text file from the voice data;
    identifying a customer associated with the electronic customer communication data received by the one or more servers;
    generating behavioral assessment data by analyzing the text file and the at least one of social media data, update status, media feed, social media review, social media data stream, social media profile or social media account setup for that identified customer; and
    displaying instructions to a user via a reporting engine, wherein the instructions are based on the generated behavioral assessment data,
    wherein the user includes the identified customer or a customer service agent.

2. The customer analysis method of claim 1, wherein at least one of the types of electronic customer communication data comprises social media data, media feed, social media review, or social media data stream, which includes video data including the voice data.

3. The customer analysis method of claim 1, wherein at least one of the types of electronic customer communication data comprises image data.

4. The customer analysis method of claim 1, which further comprises analyzing one or more of the customer's words, tones, gestures, posture, and facial expressions for behavioral assessment data.

5. The customer analysis method of claim 1, wherein the generated behavioral assessment data is analyzed to generate a rating of the customer satisfaction of the interaction.

6. The customer analysis method of claim 5, wherein the customer satisfaction is increased by displaying instructions to the user related to: correcting a customer need, improving customer service, effectiveness of one or more customer service agents, assessing distress of the identified customer or customer service agent, evaluating the personality type of the communicant, assessing performance of the customer service agent, monitoring the effectiveness of a customer service agent, providing a graphic representation of behavioral assessment data, providing a graphic representation of customer satisfaction data, or any combination of the foregoing.

7. The customer analysis method of claim 1, wherein the one or more servers includes a third-party server adapted to send and receive communications.

8. The customer analysis method of claim 7, wherein the third-party server hosts a social networking site.

9. The customer analysis method of claim 8, wherein the third-party server is configured to provide one or more application programming interfaces (APIs) adapted to integrate mobile-to-web extension applications.

10. The customer analysis method of claim 7, wherein the third-party server is configured to permit a user to interact with a profile or account setup via one or more applications or programs run by the third-party server.

11. A behavioral assessment computer program product stored on a non-transitory computer readable medium including computer executable code for analyzing electronic customer communication data, generating behavioral assessment data and displaying instructions to a user, where the computer program product comprises instructions that, when executed:
receive, by one or more servers, a plurality of types of electronic customer communication data configured to provide a user interface comprising a web site, web portal, or virtual portal or application, wherein at least one of the types of electronic customer communication data includes voice data, and at least one of social media data, update status, media feed, social media review, social media data stream, social media profile or social media account setup;
generate, by the one or more servers, a text file from the voice data;
identify, by the one or more servers, a customer associated with the electronic customer communication data received by the one or more servers;
generating, by the one or more servers, behavioral assessment data by analyzing the text file and the at least one of social media data, update status, media feed, social media review, social media data stream, social media profile or social media account setup for that identified customer; and
display instructions to a user via a reporting engine, wherein the instructions are based on the generated behavioral assessment data,
wherein the user includes the identified customer or a customer service agent.

12. The behavioral assessment computer program product of claim 11, wherein at least one of the types of electronic customer communication data comprises at least one of the social media data, media feed, social media review, or social media data stream, which includes video data including the voice data.

13. The behavioral assessment computer program product of claim 11, wherein at least one of the types of electronic customer communication data comprises image data.

14. The behavioral assessment computer program product of claim 11, which further comprises instructions that, when executed, analyze one or more of the customer's words, tones, gestures, posture, and facial expressions for behavioral assessment data.

15. The behavioral assessment computer program product of claim 11, further comprising instructions that, when executed, analyze the generated behavioral assessment data to increase customer satisfaction.

16. The behavioral assessment computer program product of claim 15, further comprising instructions that, when executed, increase customer satisfaction by displaying instructions to the user related to: correcting a customer need, improving customer service, effectiveness of one or more customer service agents, assessing distress of the identified customer or customer service agent, evaluating the personality type of the communicant, assessing performance of the customer service agent, monitoring the effectiveness of a customer service agent, providing a graphic representation of behavioral assessment data, providing a graphic representation of customer satisfaction data, or any combination of the foregoing.

17. The behavioral assessment computer program product of claim 11, wherein the server is a third-party server adapted to send and receive communications.

18. The behavioral assessment computer program product of claim 17, wherein the third-party server hosts a social networking site.

19. The behavioral assessment computer program product of claim 17, wherein the third-party server is configured to provide one or more application programming interfaces (APIs) adapted to integrate mobile-to-web extension applications.

20. The behavioral assessment computer program product of claim 17, wherein the third-party server is configured to permit a user to interact with a profile or account setup via one or more applications or programs run by the third-party server.

21. A system configured to analyze customer communications and display instructions to a user based on behavioral assessment data from the customer communications, which system comprises:
a node comprising a processor and a non-transitory computer readable medium operably coupled thereto, the non-transitory computer readable medium comprising a plurality of instructions stored in association therewith that are accessible to, and executable by, the processor, where the plurality of instructions comprises:
instructions that, when executed, receive a plurality of types of electronic customer communication data configured to provide a user interface comprising a web site, web portal, or virtual portal or application, wherein at least one of the types of electronic customer communication data includes voice data, and at least one of social media data, update status, media feed, social media review, social media data stream, social media profile or social media account setup;
instructions that, when executed, generate a text file from the voice data;
instructions that, when executed, identify a customer associated with the electronic customer communication data received by the processor;
instructions that, when executed, generate behavioral assessment data by analyzing the text file and the at least one of social media data, update status, media feed, social media review, social media data stream, social media profile or social media account setup for that identified customer; and
instructions that, when executed, display instructions to a user via a reporting engine, wherein the instructions are based on the generated behavioral assessment data,
wherein the user includes the identified customer or a customer service agent.

22. The system of claim 21, wherein the server is a third-party server adapted to send and receive communications.

23. The system of claim 21, wherein the third-party server is configured to provide one or more application programming interfaces (APIs) adapted to integrate mobile-to-web extension applications.

* * * * *